United States Patent [19]

Ellin

[11] 4,005,449
[45] Jan. 25, 1977

[54] FLASH PHOTOGRAPHIC SYSTEM WITH CAMERA INHIBIT FEATURE

[75] Inventor: Seymour Ellin, Chestnut Hill, Mass.

[73] Assignee: Polaroid Corporation, Cambridge, Mass.

[22] Filed: June 24, 1974

[21] Appl. No.: 482,379

Related U.S. Application Data

[63] Continuation of Ser. No. 424,551, Dec. 13, 1973, abandoned.

[52] U.S. Cl. .............................. 354/128; 240/1.3; 354/158
[51] Int. Cl.² ....................................... G03B 15/04
[58] Field of Search .......... 354/132, 139, 144, 149, 354/148, 126, 127, 128, 158, 170, 173; 240/1.3, 2 C; 431/95

[56] References Cited

UNITED STATES PATENTS

| | | | |
|---|---|---|---|
| 3,380,357 | 4/1968 | Harvey | 354/128 |
| 3,676,045 | 7/1972 | Watrous et al. | 431/95 |
| 3,707,903 | 1/1973 | Weber | 354/149 |
| 3,713,370 | 1/1973 | Prijn | 354/148 |
| 3,820,128 | 6/1974 | Burgarella et al. | 354/149 X |

Primary Examiner—Joseph W. Hartary
Attorney, Agent, or Firm—John W. Ericson; David R. Thornton

[57] ABSTRACT

A flash exposure system for use with a photographic camera of a variety which automatically carries out an involved photographic cycle upon the momentary depression of a start button. The system is particularly adapted to use with a linear flash array which is either replaced or reversed in its mounting upon the camera upon the expenditure of all lamps within an operational face thereof. The exposure system detects the expenditure of all lamps within an operative face of an array and inhibits the performance of an automatic cycle. Simultaneously, a perceptible warning signal apprises the operator of the expended status of the flash array.

18 Claims, 15 Drawing Figures

FIG. 2

| | | GATE A | GATE B | GATE C | GATE D | GATE E | GATE F |
|---|---|---|---|---|---|---|---|
| | | SOLENOID 80 POWER DRIVE | SOL. 80 POWER DOWN | MOTOR CONTROL | SOL. 184 POWER DRIVE | SOL. 184 POWER DOWN | FLASH TIME GATE |
| | FLASH OPERATION EVENT SEQUENCE | a b c $t_1$ | a c $t_2$ | a b d $t_3$ | a e f $t_4$ | a e g $t_5$ | e g $t_6$ |
| 1 | $S_1$ CLOSED AND SOLENOID 80 ENERGIZED, $S_4$ AT C-A | 0 0 0 1 | 0 0 0 | 0 0 0 0 | 0 0 0 0 | 0 0 0 1 | 0 0 0 |
| 2 | $S_4$ TRANSFERS TO C-B MOTOR ENERGIZED | 0 1 0 0 | 0 0 0 | 0 1 0 1 | 0 0 0 0 | 0 0 0 1 | 0 0 0 |
| 3 | $S_5$ OPENS, MOTOR STOPS SOLENOID 184 ENERGIZED | 0 1 0 0 | 0 0 0 | 0 1 1 0 | 0 1 0 1 | 0 1 0 0 | 1 0 0 |
| 4 | $S_3$ OPENS, DELAY COMMENCES, SOLENOID 184 POWER DOWN | 0 1 0 0 | 0 0 0 | 0 1 1 0 | 0 1 1 0 | 0 1 0 0 | 1 0 0 |
| 5 | SOLENOID 80 DE-ENERGIZED NET 324 ACTIVATED | 0 1 1 0 | 0 1 1 | 0 1 1 0 | 0 1 1 0 | 0 1 0 0 | 1 0 0 |
| 6 | SWITCH $S_4$ TRANSFERS TO C-A | 0 0 1 0 | 0 1 1 | 0 0 1 0 | 1 1 1 0 | 0 1 0 0 | 1 0 0 |
| 7 | NETWORK 324 TIME-OUT DE-ENERGIZE SOLENOID 184, FIRE FLASH | 0 0 1 0 | 0 1 1 | 0 0 1 0 | 0 1 1 0 | 0 1 1 1 | 1 1 1 |
| 8 | FLASH TIME-OUT BY NET 396 EXPOSURE MECHANISM BLADES COMMENCE TO CLOSE | 1 0 1 1 | 1 1 0 | 1 0 1 0 | 1 1 1 0 | 1 1 1 1 | 1 1 1 |
| 9 | $S_4$ TRANSFERS TO C-B MOTOR ENERGIZED | 1 1 1 0 | 1 1 0 | 1 1 1 1 | 1 1 1 0 | 1 1 1 1 | 1 1 1 |
| 10 | $S_3$ CLOSES | 1 1 0 0 | 1 0 0 | 1 1 1 1 | 1 1 0 0 | 1 1 0 1 | 1 0 0 |
| 11 | $S_5$ CLOSES, MOTOR STOPS | 1 1 0 0 | 1 0 0 | 1 1 0 0 | 1 0 0 0 | 1 0 0 1 | 0 0 0 |

FIG. 4

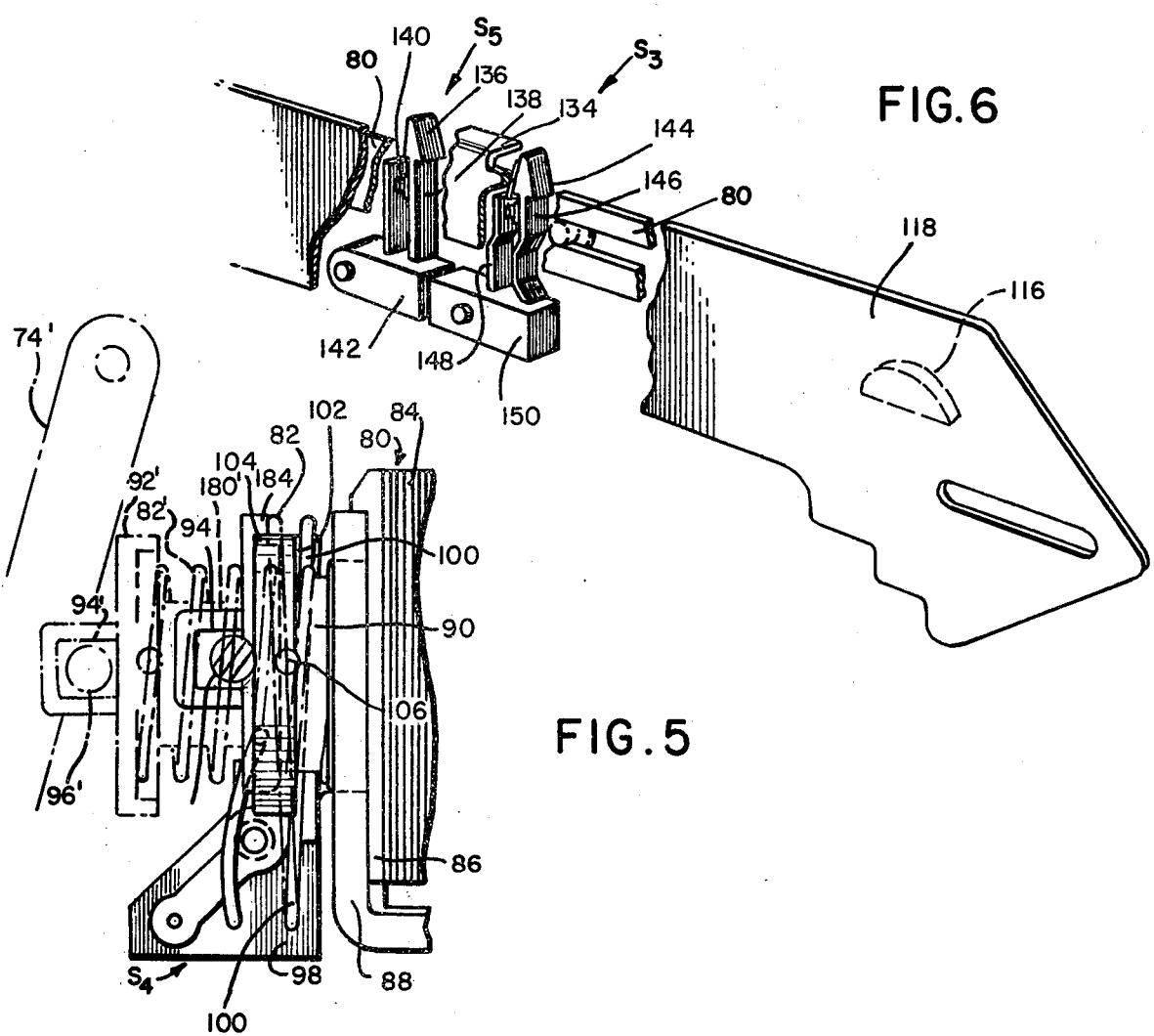
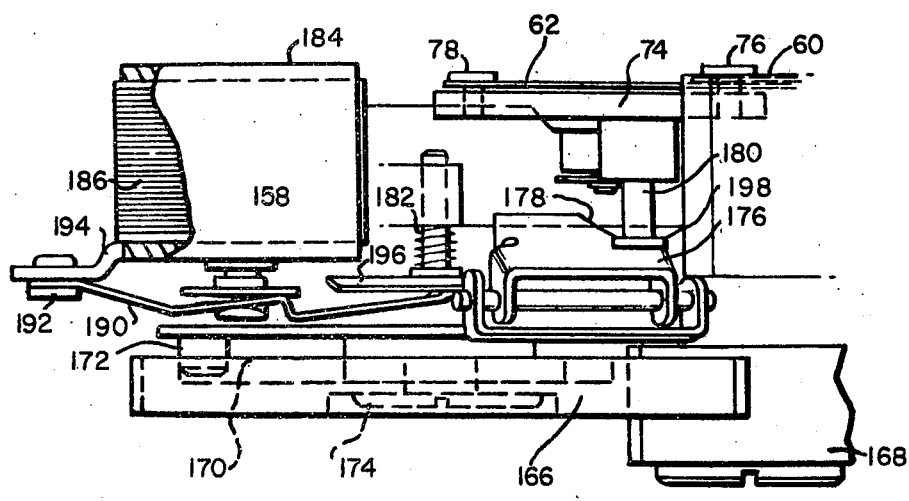

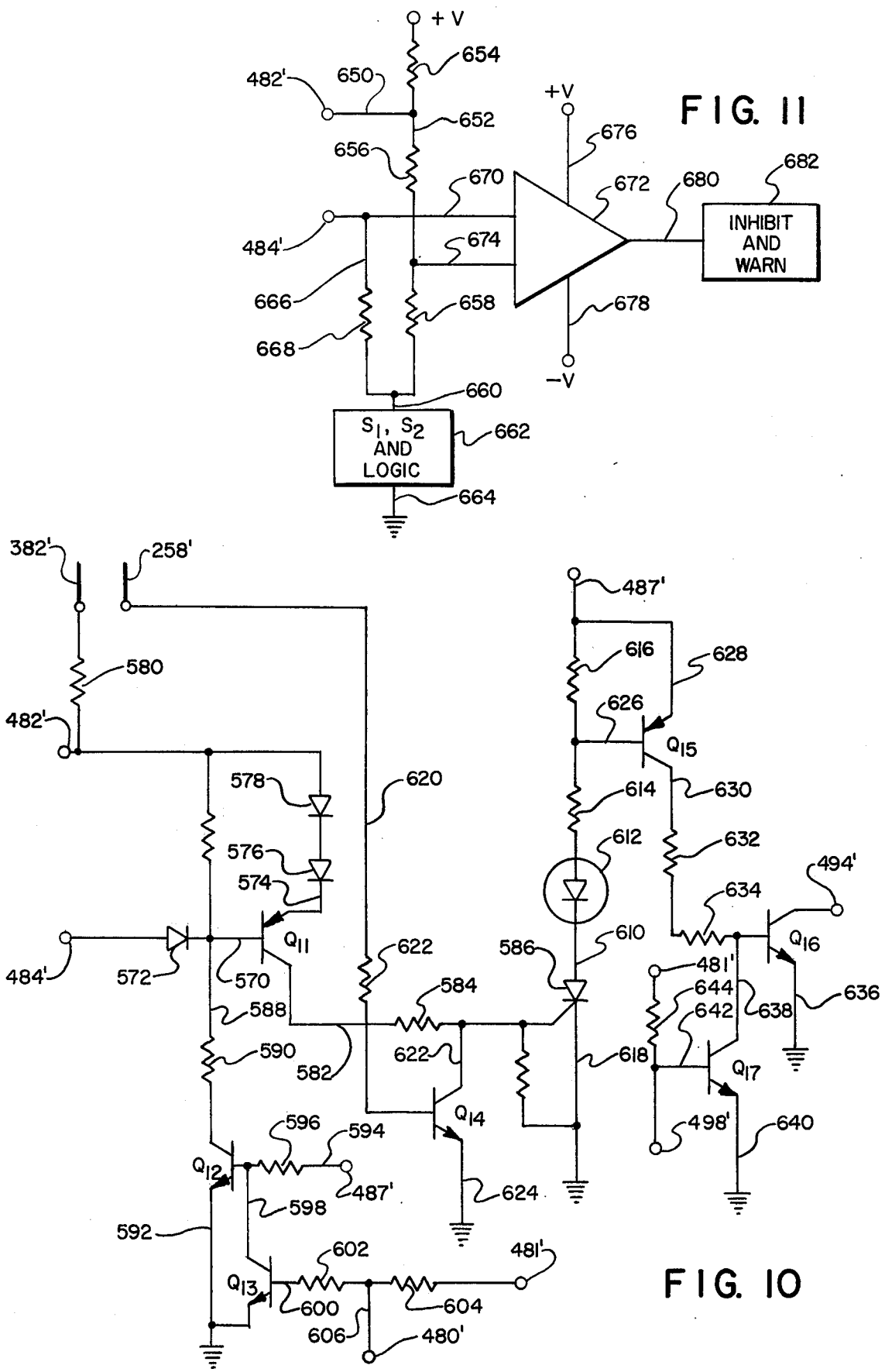

FLASH PHOTOGRAPHIC SYSTEM WITH CAMERA INHIBIT FEATURE

This is a continuation of application Ser. No. 424,551, filed Dec. 13, 1973, now abandoned.

BACKGROUND

A recent development in the field of flash photography has been the packaged linear flashlamp array. Developed for use with a highly automated camera, this flashlamp packaging arrangement is formed of two operational faces, each exhibiting an array of five flashlamps. Accordingly, when utilized in conjunction with an automatic camera, a rapid succession of photographic cycles may be carried out inasmuch as no mechanical indexing or aligning of flashlamps need be performed following each exposure.

Described in detail in U.S. Pat. Nos. 3,598,984 and 3,598,985, the dual arrays of flashlamps are compactly packaged by internesting the oppositely disposed flashlamps of each face thereof. The igniting terminals of individual lamps within the packaged arrays are connected by printed circuit technique to a downwardly extending blade mount, each side of which is configured to expose five input contacts, a common bus or lead and a circuit completing conductive surface. By inserting the downwardly extending blade mount within an appropriate receptacle within the noted camera, electrical connection is made with the five input contacts of an operationally facing array and the noted conductive surface serves to provide circuit completing contact for switching the control system of the camera into an operational mode suited for flash illumination. This operational mode as well as the general features of the automatic camera are described in detail in a co-pending application for U.S. patent by J. P. Burgarella et al., Ser. No. 333,331, filed Feb. 16, 1973, and assigned in common herewith now issued in U.S. Pat. No. 3,820,128.

To ignite successive ones of those flashlamps within an appropriately oriented operational face of an array, flash firing circuits are incorporated within the camera. Typical of such circuits is that described in U.S. Pat. No. 3,676,045. These circuits generally incorporate discrete firing networks which operate in conjunction with an aligning circuit to sequentially ignite an individual flashlamp with each actuation of the camera. The aligning circuit operates in accordance with the terminal or output characteristics common to the design of the flashlamp.

The general structure of a flashlamp with which logic sequencing or firing circuits must operate includes a glass envelope within which is sealed a quantity of combustive filamentary strand material or the like and a combustion supporting gas. This combustable component of a lamp is positioned in intimate relationship with the filament of an igniting assembly electrically coupled across the input leads of the lamp. Upon application of current to the terminals of the flashlamp, the igniting filament rapidly heats to the combustion point of the strand material and flash ignition ensues. Following ignition, the igniting filament as well as the strand material is melted and/or reduced to an ash residue which remains within the glass envelope. As a result, the terminals leading to a glass envelope are open circuited and the switching circuit to which they are coupled witnesses an infinite resistance. Should the igniting filament or strand of material incompletely combust and short the otherwise open circuited terminals of a flashlamp, a relatively high resistance will be witnessed across the terminals. The flash firing circuits react to a predetermined ohmic value across the fired or unfired bulb to derive the noted sequential selection of lamps for ignition during a given photographic cycle.

Following the expenditure or ignition of five flashlamps within one operational face of a packaged array, the operator removes the packaged array and reinserts it within the camera mounting structure in reverse to present the oppositely disposed operational face, thereby accommodating for a next five photographic flash cycles.

Often taken with the excitement of the "photographic moment" of a scene, a photographer may fail to perceive that all flashlamps within the operating side of an array have been ignited.

Failure to reverse or replace the array will cause an ensuing photograph to be aborted for improper illumination.

SUMMARY

The present invention is addressed to a flash exposure system for photographic apparatus of a variety intended for use with an array of flashlamps each of which is forwardly oriented to illuminate a scene. With the expenditure of a final or last one of the thus oriented flashlamps, the system serves to prevent the carrying out of a next succeeding photographic cycle of the apparatus in the event there is no replenishment of the flashlamp array.

In one embodiment, the photographic apparatus is present as a highly automated camera which carries out an involved sequence of successive operational events from first to last to define a photographic cycle. The system of the invention responds to the expenditure of all forwardly oriented flashlamps within the array to permit the carrying out of the first of these operational events and to inhibit the further progression of such events. In one arrangement of this embodiment, the system provides a perceptible warning in conjunction with the noted inhibition of all operational events following the first.

Where the noted automated camera is of a single lens reflex variety, the first and only operational event permitted to be carried out is that of blocking the taking optical path of the camera. Simultaneously with such activity, a warning light located on the camera housing near the entrance optics of its viewfinder is energized to apprise the operator that a photographic cycle cannot be completed without replenishment of the artificial light source. The warning light advantageously may be spaced away from the entrance optics of the viewfinder of the camera inasmuch as the camera operator will perceive only a dark background which correspondingly enhances his ability to immediately perceive a warning light even through that light is positioned remotely from the viewfinder.

As another object and feature, the flash exposure system of the invention is characterized in the use of a detector arrangement responsive to an electronic state extant at the flashlamp coupled terminals of a flashlamp selecting and firing circuit. When this state corresponds with an effective expenditure of all lamps within a forwardly oriented array of the flashlamps, the detector arrangement derives a unique signal condition representative thereof. The exposure system further includes an inhibit means or arrangement which responds to that unique signal condition to prevent the carrying out of or completion of an otherwise attempted photographic cycle. The noted response of the detector and inhibit arrangements are necessarily rapid being electronic in nature. Accordingly, the inhibit arrangement of this system further responds to a condition representing the immediate ignition of a last flashlamp of the array thereof to permit the completion of the photographic cycle representing the expenditure of that last flashlamp. For instance, in one embodiment of the invention, the inhibit arrangement is responsive to a unique signal condition of a post-exposure interval operational event to permit the camera to complete the noted photographic cycle corresponding with the ignition of a last flashlamp within an array.

As another object and feature, where the automated camera is of a folding variety, erectible from a compact orientation for carrying, the perceptible warning may be provided in conjunction with such erection. Such warning is possible inasmuch as the automated camera necessarily includes interlock switching and the like to prevent battery drain during periods of non-use.

Other objects of the invention will in part be obvious and will in part appear hereinafter.

The invention accordingly comprises the system and apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 2 is a schematic diagram of a control circuit used in conjunction with the control system of the camera of FIG. 1;

FIG. 4 is a truth table or schedule of operational events performed by the control system of the camera of FIG. 1, showing, in logic form, the input and output states of gate functions incorporated within the circuit of FIG. 2 as it operates under flash lighting conditions;

FIG. 5 is a partial pictorial representation of switching features of the camera of FIG. 1 with portions broken away to reveal internal structure;

FIG. 6 is a partial pictorial representation of another switching feature of the camera of FIG. 1 with portions broken away to reveal internal structure;

FIG. 7 is a partial top view of the shutter mechanism of the camera of FIG. 1 showing follow-focus components of the mechanism thereof in an intercept condition;

FIG. 10 is a circuit diagram showing another embodiment of the detect and inhibit arrangement of the instant invention;

FIG. 11 is a schematic representation of another embodiment of a detect feature of the instant invention;

DETAILED DESCRIPTION

Figure 1:
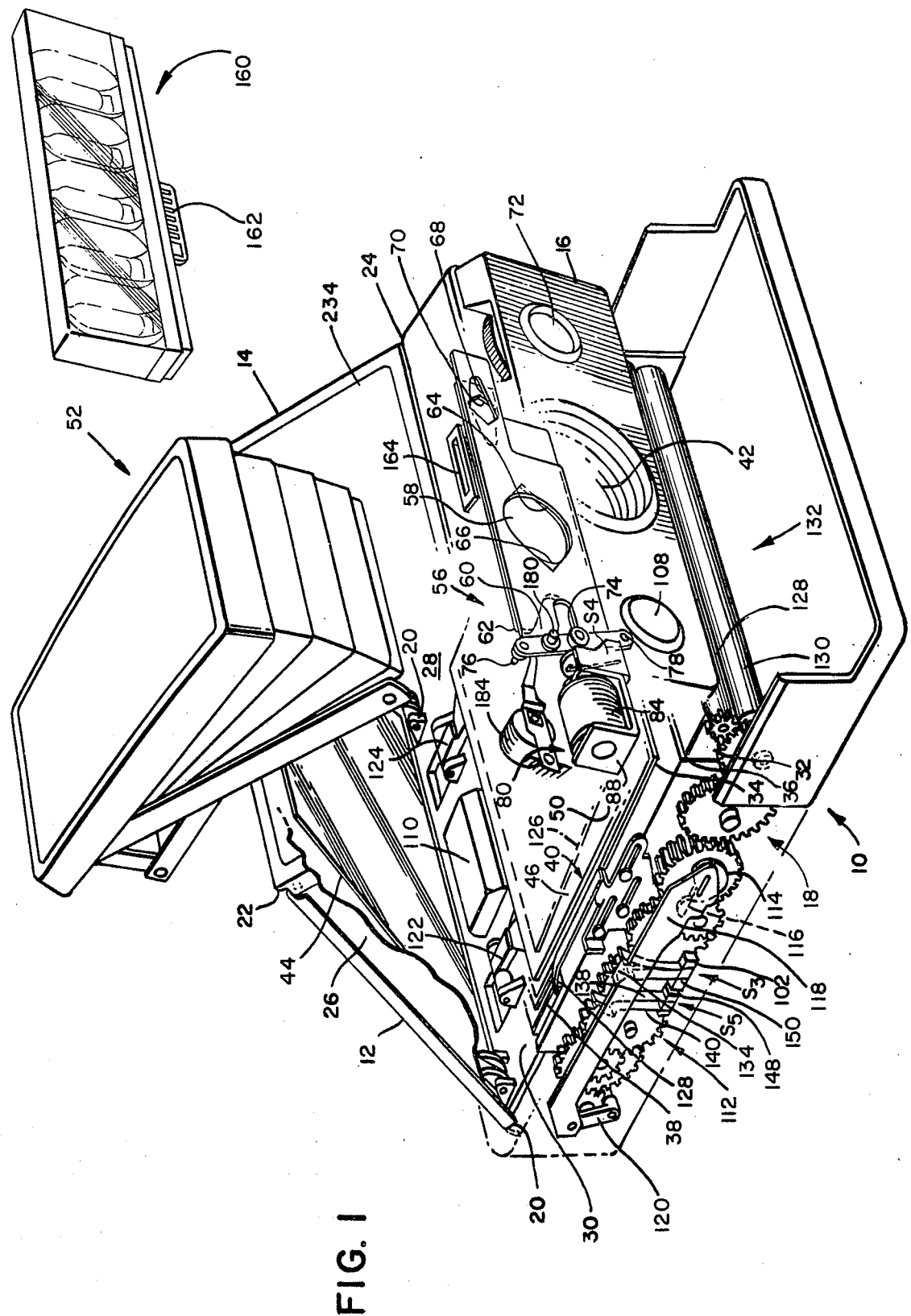
FIG. 1 is a pictorial view of a fully automatic hand-held camera incorporating the flash exposure system of the instant invention, the view having portions broken away or removed to reveal internal structure.

Referring to FIG. 1, a highly automated single lens reflex camera which may incorporate the features of the instant invention is portrayed generally at 10. The several articulated housing components of camera 10, including rear wall 12, forward wall 14 and exposure control housing 16 are pivotally associated with a base 18 so as to be foldable thereinto in nesting fashion. When so folded from the fully erected configuration shown, camera 10 assumes a thin and compact shape suiting it to be conveniently carried, for instance in the pocket of a garment. The specific hinge connections providing for the articulated structure, while not being visible in the Figure, are positioned at axes 20, 22, 24 and the lower rear portion of exposure housing 16.

When erected for photographing a scene, rear wall 12, forward wall 14 and exposure control housing 16 combine in conjunction with an opaque flexible bellows, a fragment of which is illustrated at 26, to define an exposure chamber generally depicted at 28.

Base 18 includes an inner frame assembly, a portion of which is shown at 30. Inner frame assembly 30, as well as the outward portions of base 18, cooperate to provide structural support for numerous instrumentalities of the camera. For instance, frame 30 is configured to define a receiving chamber for retaining and securing a film laden cassette structure 32 at the bottom of exposure chamber 28. Cassette 32 is of generally flat, rectangular shape and contains a stacked assemblage of photographic film units (not shown). These film units are arranged for sequential presentation at a light entrance portion of cassette 32 which is defined by a ridge shown in phantom at 34. Cassette 32 also is formed having an elongate slot 36 disposed across the forward wall thereof. Slot 36 serves as an egress means providing for the sequential removal of each film unit after it has been exposed. Cassette 32 also is formed having a slot or opening in the upward face thereof at 38 which permits the insertion of a component of a pick mechanism shown generally at 40. Mechanism 40 functions to impart initial movement to the film units as they are removed from the cassette 32.

The components of camera 10 are illustrated in orientations wherein reflex viewing and focusing may be carried out. In this regard, a taking lens 42 positioned within exposure housing 16 represents the entrance component of a viewing-focusing mode optical path. From lens 42, this path extends to a mirror 44 positioned against the inner side of rear wall 12. The path is reflected from mirror 44 to a viewing surface 46 positioned over the exposure plane of the camera. Surface 46 is mounted upon one side of a reflex component or carrier 50 which is shown in an orientation covering ridge 34 of cassette 32 and securing the exposure plane of the camera. Viewing surface 46 is configured having a texture and optical design facilitating the focusing of the image of the scene to be photographed. This image may be viewed by the camera operator through a collapsible optical viewing assembly depicted generally at 52. A configuration suited for viewing surface 46 is described in U.S. Pat. No. 3,735,685, while the assembly 52 and its related internal components are described in detail in a copending application for U.S. patent by James G. Baker, filed Dec. 15, 1970, entitled "Reflex Camera and Viewing Device" Ser. No. 98,356, assigned in common herewith and now abandoned.

While camera 10 is in the noted viewing-focusing operational mode, the exposure mechanism thereof, shown generally at 56 within exposure housing 16 establishes an aperture opening as at 58. Aperture 58 is defined by two co-acting blades 60 and 62 which slidably ride in a track (not shown) mounted within exposure housing 16. Each blade, 60 and 62, is formed having a teardrop-shaped aperture opening as shown, respectively, at 64 and 66. Additionally, the blades are formed having secondary openings, shown respectively at 68 and 70, which move in synchronism with openings 64 and 66 before the detecting elements of a photo-sensing network positioned behind an entrance optical assembly 72. As is apparent, openings 64 and 66 are positioned for movement across the optical path of camera 10 as it is established at taking lens 42. Depending upon the position of blades 60 and 62, openings 64 and 66 symmetrically overlap to define selectively varying aperture sizes. In the viewing-focusing mode orientation illustrated, it may be noted that blades 60 and 62 define an aperture opening 58 of maximum width to facilitate viewing.

Blades 60 and 62 are moved in mutual symmetry as a result of their connection with a walking beam type actuator 74 rotatably mounted at its centerpoint within housing 16. Walking beam 74 is coupled at its uppermost tip to blade 60 by a pin connection 76, while its lower portion is coupled with blade 62 by pin connection 78.

Looking additionally to FIG. 5, the rotational movements of walking beam 74 and, in consequence, blades 60 and 62, is controllably derived from a tractive electromagnetic device present as a solenoid 80 operating in conjunction with an opening spring 82. Solenoid 80 is described in detail in a copending application for U.S. patent by C. C. Petersen entitled "Tractive Electromagnetic Device" Ser. No. 245,884, filed Apr. 21, 1972 and assigned in common herewith, now issued as U.S. Pat. No. 3,805,204 and includes an excitation winding 84 which is wound about a bobbin 86 attached, in turn, to a U-shaped frame 88. A cylindrically shaped plunger 90 is slidably mounted within a corresponding central opening within bobbin 86 and the composite assembly is fixed within exposure housing 16. Opening spring 82 is mounted about plunger 90 between frame 88 and a plunger cap 92. Cap 92 is formed having a slot 94 which loosely receives a pin 96 fixed to and extending from a lower portion of walking beam 74.

With the arrangement shown, when winding 84 of solenoid 80 is energized, plunger 90 is retracted thereinto, to load or compress opening spring 82 and, simultaneously, rotate walking beam 74 in a direction causing blades 60 and 62 to close aperture opening 58. Conversely, upon the deenergization of excitation winding 84, opening spring 82 reversibly drives walking beam 74 to cause openings 64 and 66 of respective blades 60 and 62 to define progressively enlarging aperture openings about the optical path of the camera.

Operating in conjunction with solenoid 80 and opening spring 82 is a single throw double pole switch designated $S_4$. As shown in FIG. 5, switch $S_4$ is formed having an upstanding insulated base 98 fixed, in turn, to frame 88. Base 98 supports an elongate contact rod 100, the upwardly extending portion of which is configured to wipe across two separate conducting surfaces 102 and 104. Rod 100 is normally biased to move outwardly into contact with conductive surface 104. When solenoid 80 is energized and its plunger 90 is retracted, however, a pin 106 extending laterally from cap 92 drives contact rod 100 rearwardly to wipe against and make electrical contact with conducting surface 102. Conducting surfaces 102 and 104 are relatively closely spaced such that electrical contact is effected with surface 102 when plunger 90 is closely proximate its fully retracted and seated position. Conversely, contact rod 100 effects electrical contact with conducting surface 104 very rapidly upon de-energization of solenoid 80. The retracted orientation of spring 82 and cap 92 is shown in FIG. 5 in solid line fashion, while their extended positions under a de-energized state of winding 84 is shown with identical numeration marked with a prime ('). A detailed description of the solenoid driven exposure mechanism shown at 56 is presented in a copending application for U.S. patent by C. H. Biber entitled "Pneumatically Reactive Exposure Control System" filed Apr. 11, 1973, Ser. No. 349,960 and assigned in common herewith and now issued as U.S. Pat. No. 3,868,712.

Returning to FIG. 1, operator actuation of camera 10 to commence a photographic cycle following viewing and focusing is carried out by depression of a start button shown mounted upon exposure housing 16 at 108. Such actuation will cause the energization of solenoid 80 and consequent closure of blades 60 and 62 to secure exposure chamber 28. In response to a signal from switch $S_4$ that blades 60 and 62 have blocked the optical path of the camera, a dc motor 110 positioned upon inner frame 30 at the rearward portion of the camera is energized to drive a gear train shown generally at 112 extending along one side of base 18. As gears within train 112 are rotated, a cycle phase cam 114 is rotated. Cam 114 is designed for driving contact with a cam follower 116 which, in turn, is fixed to the inward side of a ram 118. Ram 118, in turn, is connected through a bell crank 120 to a drive spring system (not shown). That drive spring system, in turn, serves to bias reflex component 50 to pivot about hinges 122 and 124 into a position abutting the inner surface of rear wall 12. Actuation of this drive arrangement is carried out by rotating cam 114 a distance sufficient to release follower 116 such that the spring drive moves ram 118 forwardly and reflex component 50 upwardly. When component 50 is seated against the inner side of rear wall 12, a second mirror 126 is positioned to intercept light within the optical path of taking lens 42 and redirect it to the exposure plane of the camera. For typical ambient operation, solenoid 80 then is de-energized to permit spring 82 to drive blades 60 and 62 to define progressively varying aperture values about the optical path of the camera. A light sensing network positioned behind entrance optics 72 evaluates scene brightness and defined aperture valuations to provide a command signal which is utilized to effect the re-energization of solenoid 80 and the consequent closure of blades 60 and 62 to terminate an interval of exposure. Solenoid 80 remains energized following the exposure interval and motor 110 again is energized to drive gear train 112. The consequent rotation of cam 114 moves ram 118 rearwardly to, in turn, cock the mirror erecting spring system and move reflex component 50 into its exposure plane securing orientation. Simultaneously with this activity, pick mechanism 40 is actuated to urge the exposed film unit forwardly through slot 38 in cassette 32 and into the bite of rolls 128 and 130 of a processing station 132. Power for rotation of these rolls is derived from gear train 112 by connection with roll 128. A detailed description of the optical path conversion mechanism and drive for processing station 132 is provided in U.S. Pat. No. 3,714,879.

Looking additionally to FIG. 6, the arrangement for actuating two switches designated $S_3$ and $S_5$ during the movement of ram 118 is revealed in more detail. As ram 118 commences forward movement in conjunction with the noted release of reflex component 50, a tab 134 extending inwardly from the midportion of ram 118 releases from engagement with the insulative cap 136 of a resilient leaf 138 of switch $S_5$. Switch $S_5$ additionally includes a resilient leaf 140 which is supported along with leaf 138 from an insulative base 142 fixed to base 18 of the camera 10. Accordingly, the contacts represented by leaves 138 and 140 of switch $S_5$ are opened substantially in synchronism with the initial movement of component 50 from its viewing or exposure plane position. This represents a first signal condition of the switch which is retained until photographic cycle termination.

The spring bias rotational travel to reflex component 50 about its hinges 122 and 124 from its seated exposure position entails about 37°. When reflex component 50 somewhat closely approaches this seated position against rear wall 12 and mirror 44, or at about 32° of rotation, tab 134 contacts the insulative cap 144 of a resilient leaf 146 of switch $S_3$. Leaf 146 normally is in contact with a second leaf 148 of switch $S_3$ and both leaves are supported from an insulative base 150, also fixed to camera base 18. Serving to monitor the movement of reflex component 50, the open contacts of switch $S_3$ provide a signal condition evidencing that the component 50 has approached its seated position against rear wall 12. Of course, during the post-exposure operation of camera 10 and consequent driven movement of ram 118 in a rearward direction, tab 138 releases from engagement with the cap 144 of switch $S_3$ to permit it to close and re-engages cap 136 of switch $S_5$ to close it. The latter closure of switch $S_5$ provides a signal utilized to terminate energization of motor 110 as well as energization of solenoid 80.

Flash illuminated pictures are taken with camera 10 utilizing the packaged linear array of flashlamps as shown at 160 in FIG. 1. Array 160 is formed having five flashlamps along with corresponding reflectors facing outwardly from each face thereof. The five flashlamps are connected by printed circuitry or the like to a downwardly extending mounted blade as at 162. Each side of blade 162 is formed having conductive surfaces which serve as terminals leading to each flashlamp and, additionally, the mount is configured having a conductive surface unconnected with the flashlamps which serves to close appropriate circuitry within the camera to cause it to carry out a flash cycle. Appropriate connection with the circuitry of camera 10 is made upon inserting the blade 162 of array 160 into a mount 164 positioned upon the top surface of exposure housing 16.

As described in a copending application for U.S. patent by L. M. Douglas entitled "Apparatus and System for Flash Photography" Ser. No. 168,671, filed Aug. 3, 1971 assigned in common herewith, now abandoned and replaced by application Ser. No. 341,730 and now issued as U.S. Pat. No. 3,832,722, when in a flash operational mode, camera 10 utilizes a follow-focus exposure control arrangement. Under such an arrangement, aperature is established in correspondence with focal distance for the light anticipated at a subject. Accordingly, blades 60 and 62 are interrupted at a subject. Accordingly, blades 60 and 62 are interrupted mechanically during their opening movement at a position corresponding with focus setting. Looking additionally to FIG. 7, the intercept mechanism for carrying out this function is shown in detail. The focus wheel for camera 10 is shown at 166 and is located in a forward portion of exposure housing 16. Wheel 166 is interconnected with the bezel of taking lens 42 through an idler gear, a portion of which is shown at 168. To relate the focus position of wheel 166 with the aperture definition of blades 60 and 62, an intercept linkage is provided which includes a cam follower linkage 170 having a follower pin 172 which rides within a face groove cam formed within the inner surface of focus wheel 166. Follower link 170 is pivotally mounted over the centrally disposed axle of wheel 170 at 174. Accordingly, with the rotation of wheel 166, linkage 170 is manipulated laterally. The upper portion of follower linkage 170 is configured to pivotally support an arresting link 176. Link 176 is configured having a surface 178 which is movable into the locus of travel of a corresponding intercept pin 180 extending outwardly from walking beam 74. Normally biased by a spring loaded pin 182 away from such locus of travel, arresting link 176 is moved into an intercepting orientation as a result of the energization of a second solenoid 184 mounted rearwardly and above solenoid 80 within housing 16. Solenoid 184 is configured having an excitation winding 186 which surrounds a centrally disposed cylindrical plunger 188. The tip portion of plunger 188 is connected to the central portion of a pull-down bar 190 which, in turn, is loosely pinned at 192 to an extension 194 of the bracket of solenoid 184. The opposite tip of pull-down bar 190 is aligned so as to be selectively contactable with an extension 196 of arresting link 176. Accordingly, with the energization of solenoid winding 186, plunger 188 is retracted to, in turn, cause pull-down bar 190 to move arresting link 176 into an orientation wherein its surface 178 is within the locus of travel of pin 180. Note that the outer tip of pin 180 is configured having a flanged portion 198. With such an arrangement, winding 186 of solenoid 184 may be de-energized following the noted interception. Inasmuch as opening spring 82 maintains walking beam 74 in a biased condition enhancing the interception, no continued energization of winding 186 is required. At the conclusion of a flash exposure interval, solenoid 80 is energized to close blades 60 and 62 and camera 10 cycles through a normal post-exposure operational phase.

Referring to FIGS. 2, 3, 3A and 4, a schematic diagram for a control circuit suited to regulate the instrumentalities of camera 10 as well as a logic block diagram and related energization state truth tables are revealed. The circuit of FIG. 2 includes a series of multi-function GATES designated A-I. The inputs and outputs for these GATES are depicted in Boolean enumeration in the noted truth table of FIG. 4. For purposes of facilitating an understanding of the tabulations of FIG. 4 and the description of the circuit diagram, when the inputs or outputs of the listed components are at ground reference potential, they are referred to as "low" and, additionally, such input or output may be digitally identified as 0. Conversely, when these inputs and outputs assume or approach the voltage status of the power supply of the control circuit, they are referred to as being "high" and are given the binary designation 1. It may be noted further that certain of the GATE input terminals receive common signals. These common signal terminals are identified by the letters "$a - g$". Additionally, the outputs of GATES A - I are identified, respectively, by the letters "$t_1 - t_6$."

Figure 3:
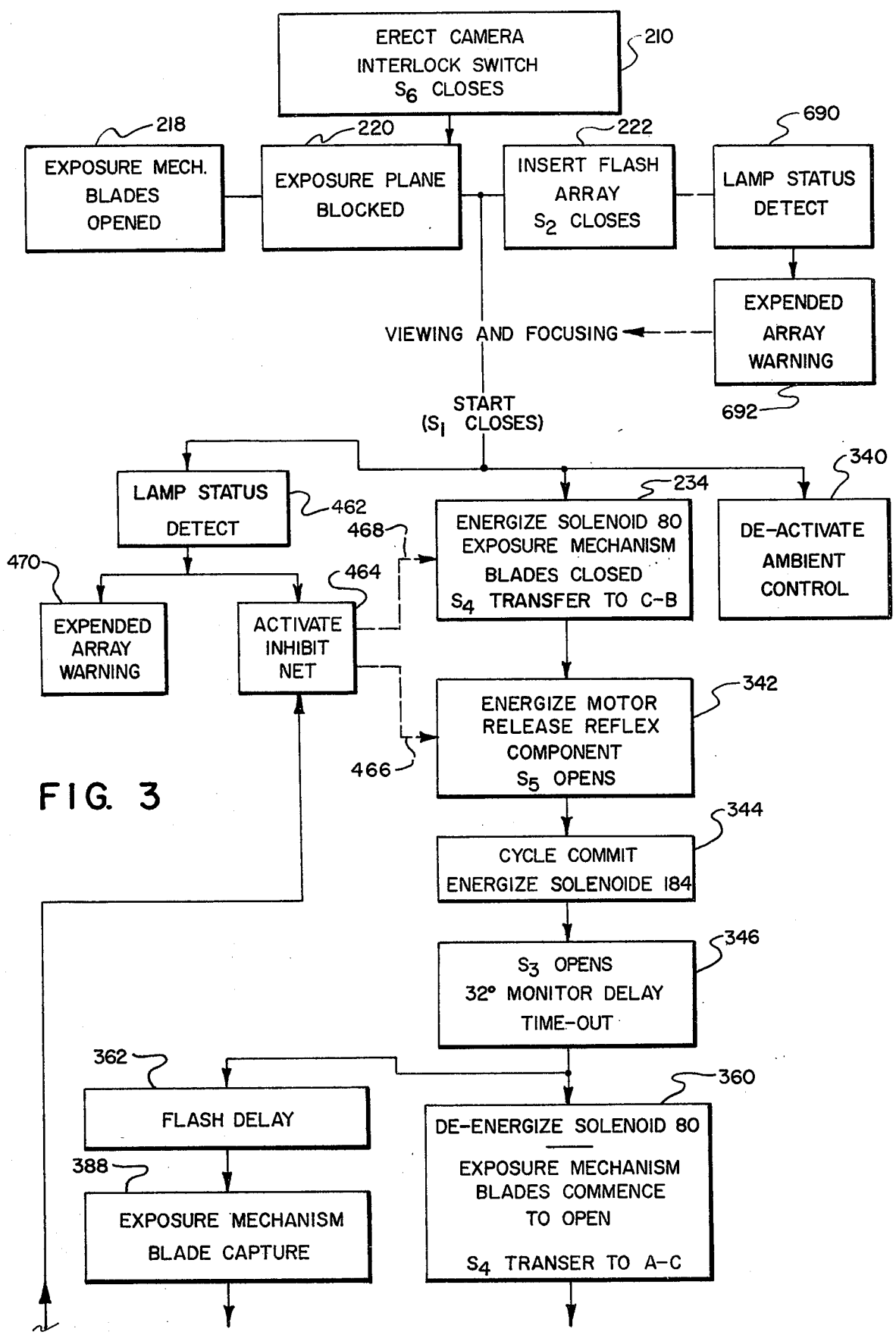
FIGS. 3 and 3A combine to form a block logic diagram showing the sequence of events occurring during operational cycles of the camera of FIG. 1, the topmost portion of FIG. 3A being intended for attachment with the lowermost portion of FIG. 3.

In the discourse to follow, the control circuit of the camera is described as the camera is operated in a flash operational mode. Looking initially to FIGS. 2 and 3, as camera 10 is unfolded into its erected configuration, an interlock switch designated $S_6$ in main power lead 212 is closed to permit a battery power supply 214 to energize the circuit through main power lead 216 in response to the momentary depression of a switch designated $S_1$. This switch is operator actuated upon depression of start button 108 (FIG. 1). As depicted by blocks 218 and 220, camera 10 will be in an initial state wherein exposure mechanism blades 60 and 62 are fully open and reflex component 50 is oriented to block the exposure plane of the camera. For flash operation, flash array 160 is inserted to close a switch designated $S_2$. As indicated in FIG. 3, viewing and focusing may now take place following which the operator depresses switch $S_1$. So activated, the main power lead 216 serves to energize a latching network depicted functionally by block 224. Described in detail and claimed in a copending application for U.S. patent entitled "Control System for Photographic Apparatus" by J. P. Burgarella, P. P. Carcia and R. C. Kee, Ser. No. 213,317 filed Dec. 29, 1971 and assigned in common herewith and now issued as U.S. Pat. No. 3,744,385, network 224 operates under two energization states. The first of these states permits the operator of camera 10 to abort a photographic cycle until such time as switch $S_5$ is opened. Following the opening of switch $S_5$, the second energization state at network 224 permits a continuous powering of the circuit from lines 216 and 226 even though the contacts of switch $S_1$ are separated.

The output of latching network 224 is present at a power distribution line 228 which, in turn, is connected to a branch power line 230. Branch power line 230 is connected to a second branch power line 232 and these two lines serve to power and assert initial control conditions over the various gates and components within the entire circuit.

These conditions, as they exist at the commencement of a flash photographic cycle, are tabulated at Event No. 1 in FIG. 4. As is illustrated in connection with function block 234 in FIG. 3, the initial operational event to take place is that of energizing the excitation winding 84 of solenoid 80. This winding is indicated by an 84' in FIG. 2. Energization of winding 84 is carried out by asserting select input conditions to the input terminals of multi-function GATES A and B. Looking to these inputs, inut terminals $a$, commonly connected by lines 236 and 238, exhibit an initial "low" status by virtue of their connection along line 240 to the output of a trigger circuit depicted generally at 242. Trigger 242 may be of a conventional design, for instance, a Schmitt-type having a normally conducting output stage and a normally non-conducting input stage. These stages operate to reverse their conductive states very rapidly upon receipt at the input stage of a signal which is at least equal to a predetermined triggering reference or threshold level. Energized from branch power line 230 from line 244 and coupled to ground through line 246, the output at line 240 of trigger 242 remains low until a signal above the noted triggering reference level is received at any of its input lines. Upon receipt of such a signal, the output at line 240 assumes a high status. For exposure control under ambient lighting conditions, such an input signal is received from along line 246 and is generated from an ambient control network depicted functionally by block 248. Function 248 is energized from line 228 and is coupled to ground through line 250.

Gate input terminal $b$ of GATE A evidences a low state by virtue of its connection through line 252 and limiting resistor 254 to ground. Line 252 also is coupled through line 256 to a corresponding gate input terminal $b$ of GATE C and, through line 258 to one contact of switch $S_4$. Switch $S_4$ corresponds with that described in conjunction with FIG. 5 and is shown having a common terminal C corresponding with contact rod 100 as well as alternate contacts A and B, the latter contact being coupled to line 258. When switch $S_4$ assumes condition C-A, it is considered to be in an orientation wherein the contact rod 100 is in contact with outwardly disposed contact surface 104. Under such conditions, blades 60 and 62 will be in some open or aperture defining orientation. When switch $S_4$ assumes condition C-B it is considered to be in the orientation described wherein contact rod 100 is in contact with conducting surface 102, blades 60 and 62 assuming a fully closed orientation. Inasmuch as switch $S_4$ is normally in a C-A condition at the commencement of a photographic cycle, line 258 is open circuited. At such time as switch $S_4$ assumes a C-B condition, line 258 is energized through line 260 to alter the status of common input terminals $b$ to a high state.

Gate input terminal $c$ of GATE A is coupled through line 262 and line 264 to the corresponding common input terminal of GATE B. The initial low status of common input terminals $c$ is derived as a result of the connection of line 264 through line 266 to the output line 268 of a trigger 270. Similar to trigger 242, the output of trigger 270 is normally low and will assume a high status in response to the receipt of a signal above a predetermined triggering or threshold value at its input line 272. Trigger 270 operates to retain common input terminals $c$ at a low state during the pre-exposure phase of a photographic cycle.

With the assertion of the above-described input logic, the resultant output, $t_1$ of GATE A present at line 274 is high and is imposed at the base of an NPN transistor $Q_1$. The emitter of transistor $Q_1$ is coupled along line 276 to ground while its collector is connected to line 278. Line 278, in turn, connects the excitation winding 84' of the solenoid 80 to power line 216. The high status at line 274 serves to forward bias the base-emitter junction of transistor $Q_1$, thereby energizing winding 84' to cause exposure mechanism blades 60 and 62 to move to block the optical path of camera 10. The output $t_2$ of GATE B is low at the commencement of a photographic cycle and is coupled through a current limiting resistor 280 and line 282 to line 278. GATE B serves a powering down function wherein solenoid 80 is energized at a lower current level when the plunger thereof approaches its fully retracted position. To carry this out, GATE B diverts solenoid energizing current through limiting resistor 280. When transistor $Q_1$ is forward biased, however, this diversion through resistor 280 is insignificant.

As blades 60 and 62 reach their closed terminal orientations, the contacts of switch $S_4$ transfer to derive a C-B condition. As noted at Event No. 2 of FIG. 4, this condition for switch $S_4$ alters the $b$ input terminal state at line 252 from a low to a high to, in turn, cause the output $t_1$ of GATE A to become low. In consequence, the forward bias at transistor $Q_1$ is removed and the power down energization of winding 84' ensues.

This transfer of switch $S_4$ to a C-B condition also alters the output $t_3$ of GATE C. Prior to such switch transfer the output $t_3$ at line 284 of GATE C is low. This low output is established by virtue of the low states of common input terminals $a$ and $b$ as well as a low value for common input terminal $d$. Gate input terminal $d$ of GATE C remains low in consequence of its connection through lines 286, 288 and closed switch $S_5$ to ground. With the transfer of the switch $S_4$ common contact to a C-B orientation, and the consequent alteration of common input terminal $d$ to a high value, the output $t_3$ of GATE C converts to a high state to effect the actuation of motor control function 290. Control 290 is coupled with main power lead 216 through line 292 and to ground through line 294. Described in detail in a copending application for U.S. patent by J. J. Abbadessa, Ser. No. 299,667, entitled "Photographic Apparatus with Precision Motor Control", filed Oct. 24, 1972 assigned in common herewith and now issued as U.S. Pat. No. 3,811,081, motor control function 290 serves to energize motor 110 to cause gear train 112 to commence to rotate cycle phase cam 114. As described in connection with FIG. 6, such rotation continues until ram 118 is released to cause the opening of switch $S_5$ as identified in line 288 in FIG. 2. With this release of ram 118, camera 10 is committed to the completion of an exposure cycle. Further, it is important to note that switch $S_5$ provides a unique closed signal condition prior to an exposure interval and a unique open condition during and following that exposure interval.

As disclosed at Event No. 3, the opening of switch $S_5$ alters the status of input terminal $d$ of GATE C to a high condition which, in turn, serves to alter the output $t_3$ of GATE C to a low state. As a consequence, motor control function 290 de-energizes and brakes motor 110. As ram 118 is driven forwardly, reflex component 50 is spring driven toward its exposure orientation against the back wall 12 of camera 10.

The alteration of the status of common input terminal $d$ also serves to signal latching network 224 to assume its second energization state by virtue of its connection with input line 286 through lines 296 and 298.

As described in connection with the mounting of flash unit 160 within camera mount 164, the camera 10 is set for flash mode operation with the closure of a mode switch identified in FIG. 2 as $S_2$. Closure of switch $S_2$ takes place with the making of a contact between a conducting surface on mounting blade 162 and with a contact within housing 16. Thus closed, switch $S_2$ introduces a high value signal from power distribution line 228, resistor 300, line 296, resistor 302 and line 304 to ambient control circuit 248. This high signal introduction along line 304 serves to disable control circuit 248. Switch $S_2$ is shown located within line 296 and is coupled to ground through resistor 306. Line 304 also extends through line 308 to common input terminals $e$ of GATES E and D. Accordingly, with the opening of switch $S_5$, a high signal is asserted from line 228 through switch $S_2$ and lines 304 and 308 to alter the state of input terminals $e$ to a high value. Lines 310 and 312 connect common gate input terminals $a$ of GATES E and D to line 238 and, therefore, are low during the initial portion of a photographic cycle. Input terminal $f$ of GATE D remains low in consequence of its connection through lines 314, 316, diode 318, closed switch $S_3$ and ground. Switch $S_3$ will be recognized as that described in connection with FIGS. 1 and 6. Diode 318 serves to suppress spurious signals and the like generated in the operation of switch $S_3$.

Input terminal $g$ of GATE E retains an initial low status as a result of its connection along line 320 to the output stage of the trigger 322 of an R-C timing network shown generally at 324. Trigger 322 may be of a Schmitt variety, having a normally non-conducting input stage operating in conjunction with a normally conducting output stage. These stages rapidly reverse their conductive states upon receipt of a threshold level signal at the input stage.

As described in connection with Event No. 3 of FIG. 4, with the opening of switch $S_5$, the output $t_4$ at line 326 of GATE D becomes high. Line 326 is coupled to the base of an NPN transistor $Q_2$. The emitter of tranisitor $Q_2$ is coupled through line 328 to ground, while its collector is coupled through lines 330 and line 332 to power lead 216. Also within line 332, is the winding 186 (shown primed) of solenoid 184. Accordingly, as described in connection with FIG. 7, surface 178 of intercept link 176 is drawn to an intercepting location within the locus of travel of walking beam pin 180. At this time, output $t_5$ of GATE E converts to a low permitting current flow through line 134. However, as a result of the presence of a current limiting resistor 336, the value of such current is dismissable.

Looking momentarily to FIG. 3, the de-activation of ambient control function 248 is depicted by block 340, the energization of motor 110, release of reflex component 50 and opening of switch $S_5$ is depicted at block 342 and the commitment of camera 10 to completion of a photographic cycle along with the energization of solenoid 184 is represented at block 344.

As shown at block 346 in FIG. 3 and represented at Event No. 4 in FIG. 4, as reflex component 50 is elevated through about 32° of rotation, switch $S_3$ is opened. The technique for such opening actuation has been described in connection with FIG. 6 and serves in a first aspect to activate an R-C timing network identified generally at 350. Formed of a timing resistor 352 and a timing capacitor 354 coupled within line 232 to ground, network 350 serves to delay the commencement of the exposure phase of a photographic cycle. This delay is selected in accordance with a time constant sufficient to permit reflex component 50 to fully seat at its exposure position. Network 350 is activated upon removal of a shunt about capacitor 354 which is constituted by a line 356, connected from a point intermediate capacitor 354 and resistor 352 at input line 272 to ground through a diode 358 and switch $S_3$.

Diode 358 serves to isolate line 356 from spurious signals and the like.

Switch $S_3$ also operates under a second aspect of asserting a power-down condition upon the winding 186' of solenoid 184. As switch $S_3$ is opened, a high signal is imposed from lines 316 and 314 into input terminal $f$ of GATE D. This input alteration changes output $t_4$ from a high to a low state. As a consequence, the forward bias at transistor $Q_2$ is removed and energizing current for excitation winding 186' of solenoid 184 is diverted through a path including current limiting resistor 336 and output line 334 of GATE E.

When delay network 350 attains the requisite threshold level of trigger 270, the output thereof at line 268 converts from a low state to a high state. As described in conjunction with blocks 360 and 362 of FIG. 3 and at Event No. 5 of FIG. 4, this transistion serves to activate flash delay network 324 and to de-energize excitation winding 84' of solenoid 82. The exposure phase of a photographic cycle is initiated and common input terminals $c$ of GATES A and B are converted to a low state. This conversion changes output $t_2$ of GATE B to a high state, thereby de-energizing excitation winding 84'. Exposure mechanism blades 60 and 62 are released for movement toward their open terminal positions.

The fixed delay provided by flash delay network 324 is selected in accordance with the amount of time required for blades 60 and 62 to achieve their terminal open positions. However, the blades usually are captured at some intermediate position by interceptor link 176 (FIG. 7). To activate network 324, the high output of trigger 270 at line 268 is converted to a low state by an inverter 364. From inverter 364, the resultant low signal is introduced along line 366 to the base of an NPN transistor $Q_3$. The collector of transistor $Q_3$ is connected along line 368 at a point representing a junction between a timing resistor 370 and a timing capacitor 372. The opposite side of capacitor 372 is connected to line 374 which, in turn, is coupled between the emitter of transistor $Q_3$ and line 376 extending from trigger 322 to ground. Trigger 322 is connected with branch power line 232 from along line 378. During the time-out of delay network 350, the high signal from converter 364 at line 366 serves to forward bias to base-emitter junction of transistor $Q_3$, thereby imposing a shunt about capacitor 372. When trigger 270 fires, its inverted output at line 366 removes the forward bias of transistor $Q_3$ to remove the noted shunt and activate network 324.

As described in connection with FIG. 5 at Event No. 6 of FIG. 4 and at block 360 in FIG. 3, when exposure mechanism blades 60 and 62 commence to open, switch $S_4$ assumes a C-A contact condition. This condition serves to activate by energization a flash firing circuit 380 from along line 382. Having a firing input connected to line 334 and coupled to ground through line 384, circuit 380 serves to select and fire individual flashlamps within the linear array as shown at 160 in FIG. 1. The energization of circuit 380 is depicted in FIG. 3A at block 386.

As described in connection with FIG. 7, when exposure mechanism blades 60 and 62 reach their follow-focus orientation, pin 180 of walking beam 74 is captured to establish taking aperture. This capture is represented in FIG. 3 at block 388.

Figure 3A:
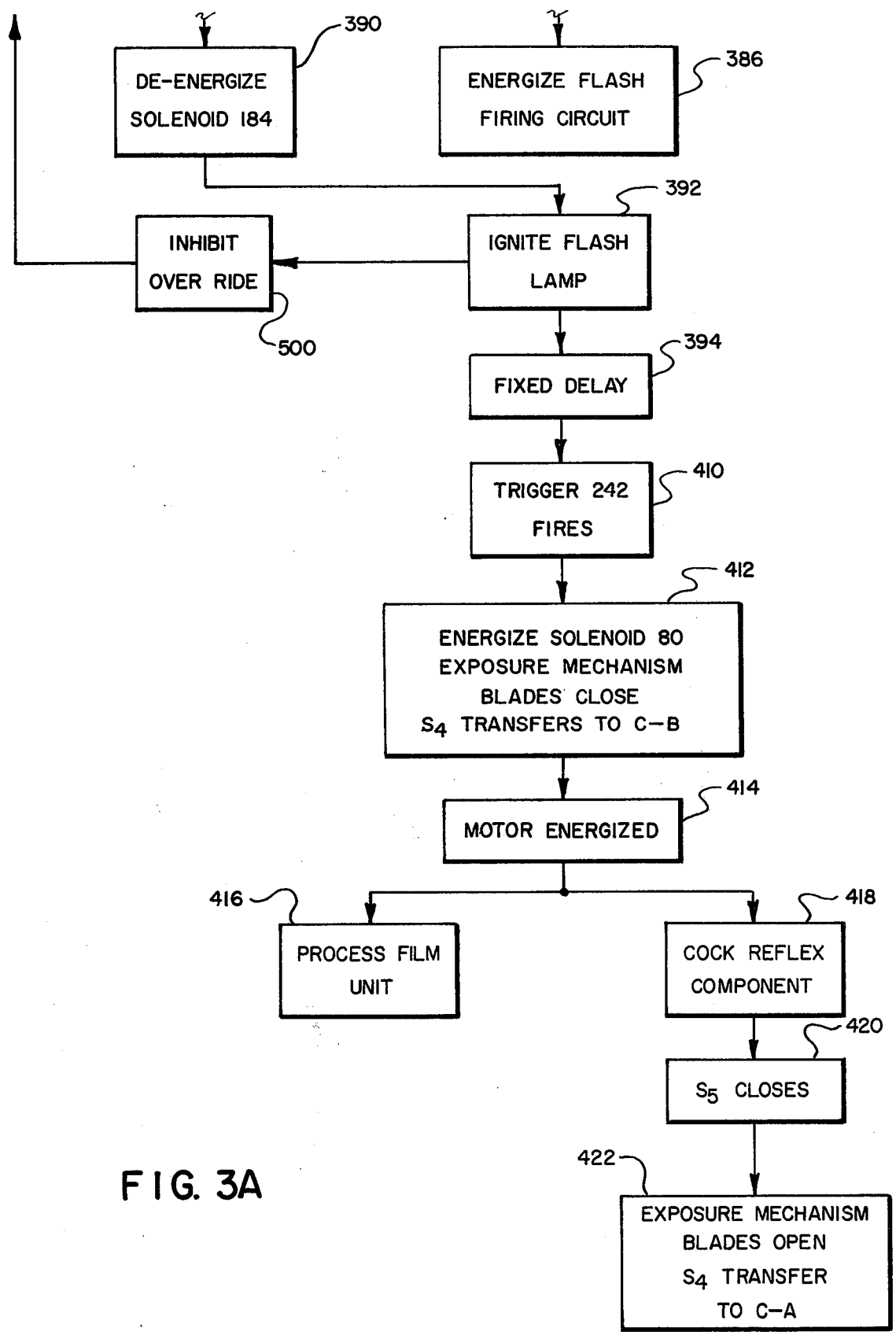

As represented at Event No. 7 in FIG. 4 and at blocks 390 and 392 in FIG. 3A, at the time-out of flash delay network 324, the output of trigger 322 alters from a low condition to a high state to, in turn, act through line 320 to alter the condition of input terminal $g$ of GATE E from a low to a high state. This change alters the output $t_5$ from a low state, permitting the energization of excitation winding 186', to a high state de-energizing solenoid 184. As discussed in connection with FIG. 7, walking beam 74 does not move inasmuch as flange 198 of pin 180 mechanically captures camming edge 178 of interceptor link 176. The pre-established aperture of the exposure mechanism remains unaltered. With this de-energization, a fly-back pulse is generated from winding 186' which is witnessed at lines 332, 330 and 334. Line 330 is connected through resistor 336 to input line 334 of flash firing circuit 380. Circuit 380 responds to the noted fly-back pulse and ignites a select flashlamp within flash array 160.

Figure 2:
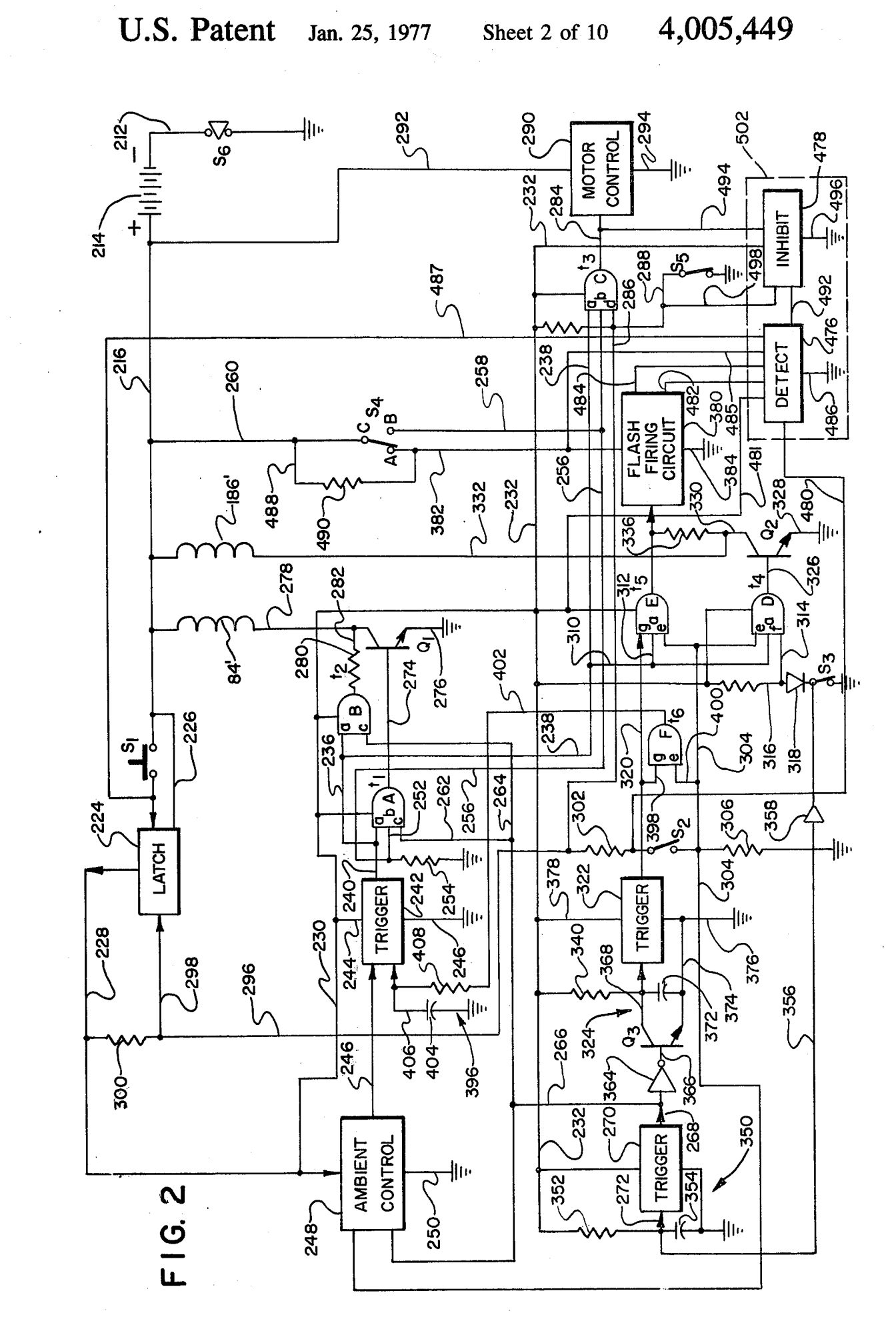

As depicted in block 394 of FIG. 3A, the control system of FIG. 2 provides for a fixed interval of exposure corresponding with the ignition time of a flashlamp within array 160. With the generation of a high state from trigger 322 at line 320, common input $g$ of AND GATE F assumes a high state by virtue of its connection with line 320 through line 398. The second input to GATE F is represented as a common input $e$ which is coupled through line 400 to line 304. Line 304 maintains a high state with the closure of switch $S_2$. The resultant high output of GATE F is present at line 402 and serves to activate flash timing network 396. Network 396 includes a timing capacitor 404 coupled within line 406 between an input to trigger 242 and ground. The opposite side of network 396 is present as a timing resistor 408 present within line 402 and coupled with line 406.

As depicted at blocks 410 and 412 and represented as Event No. 8 in FIG. 4, when network 396 achieves the threshold or triggering level of trigger 242, the output thereof at line 240 alters from a low to a high state. The resultant high output alters the status of common gate input terminals $a$ to a corresponding high status. As a consequence, the outputs of Gates A and B are inverted. For instance, output $t_1$ of GATE A is changed to a high status and output $t_2$ of GATE B is changed to a low status. A high output at line 274 serves to forward bias the base-emitter junction of transistor $Q_1$, thereby energizing solenoid winding 84' from line 278. Solenoid 80 commences to retract plunger 90 to, in turn, drive exposure mechanism blades 60 and 62 into a closed orientation. As shown at Event No. 9 in FIG. 4, as blades 60 and 62 reach closure, switch $S_4$ transfers to a C-B orientation isolating line 382 of flash firing circuit 380. This alteration of switch $S_4$ additionally converts the status of input terminals $b$ at GATES A and C from a low to a high state. As shown at Event No. 9 in FIG. 4 and at block 414 in FIG. 3A, the latter input alteration changes the output $t_3$ of GATE C to a high status, thereby activating motor control function 290 to, in turn, energize motor 110. The control system thereby is caused to progress to its post-exposure phase during which, as shown at blocks 416 and 418 of FIG. 3A, an exposed film unit is processed and relex component 50 is driven toward its position covering the exposure plane of camera 10. As shown at Event No. 10 in FIG. 4, at the commencement of reflex component movement, switch $S_3$ is closed and, when the reflex component reaches its exposure plane covering orientation, switch $S_5$ is closed as shown at Event No. 11 and at block 420 in FIG. 3A. Thus closed, switch $S_5$ serves to shut down the entire system including the de-energization of windingg 84'. In consequence, as shown at block 422 at FIG. 3A, exposure mechanism blades 60 and 62 are driven by opening spring 82 into their fully open orientation. Note that switch $S_5$ reassumes its closed or initial position only at the termination of a given photographic cycle.

Figure 8:
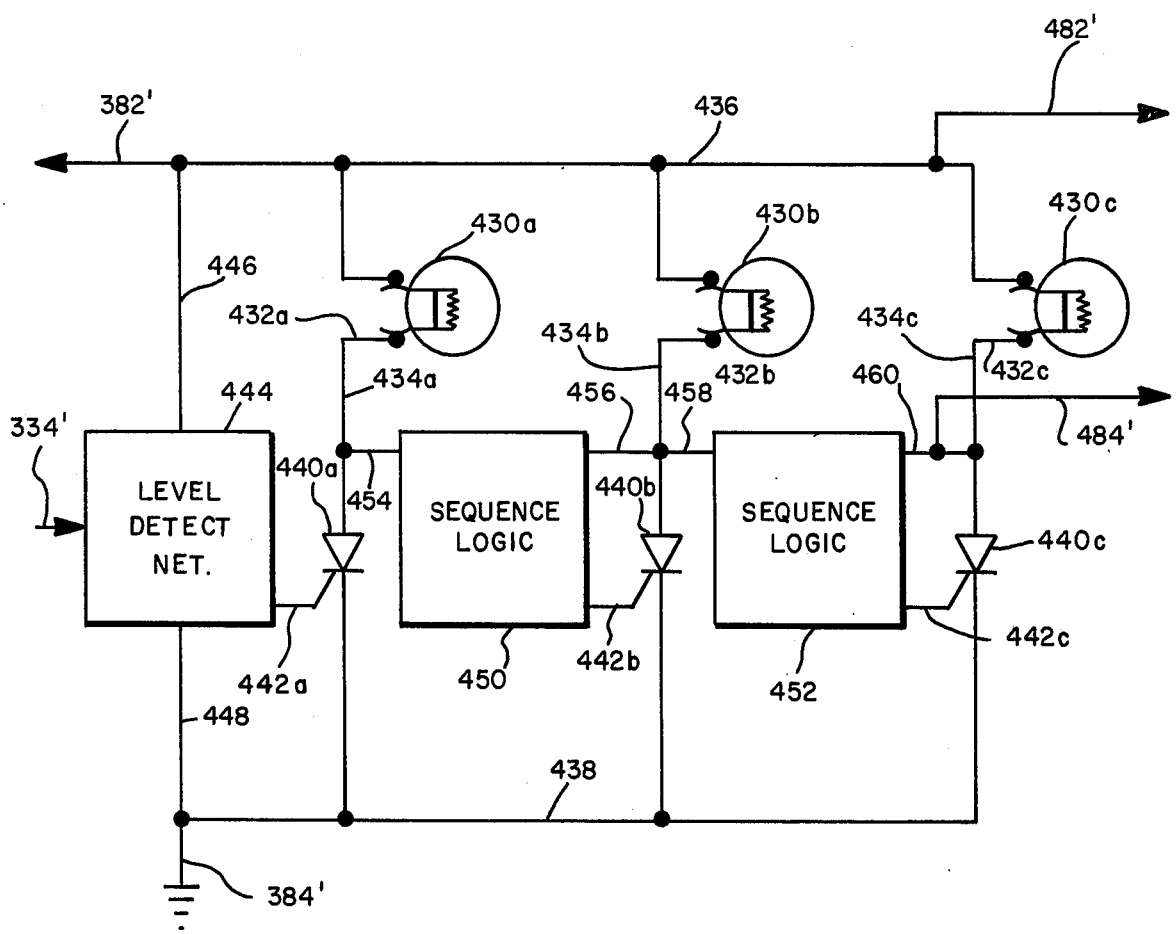
FIG. 8 is a schematic diagram of a flash ignition and sequencing network shown in block form in FIG. 2.

Looking now to FIG. 8, the configuration of flash firing circuit 380 is revealed in more detail. For purposes of clarity, where leads or lines previously identified in FIG. 2 are reproduced in FIG. 8, they are presented primed ('). In the figure, a plurality of flashlamps 430a–430c are shown connected, respectively, to the terminals 432a–432c of three lamp circuit lines 434a–434c. Circuit lines 434a–434c are connected in parallel circuit relationship to one another between power leads 436 and 438. Lead 436 is coupled to battery power lead 216 (FIG. 2) through switch $S_4$ are line 382'. Correspondingly, power lead 438 is coupled to ground through line 384'. Primary switching for each of the flashlamps 430a–430c is provided by SCR's 440a–440c positioned within respective lines 434a–434c. The gate electrode 442a of SCR 440a is connected to the output of a level detecting network 444. Connected between power leads 436 and 438 through respective lines 446 and 448, network 444 is configured for receiving the flash energizing pulse from line 334'. This pulse is of short duration, for instance about 10 microseconds and is generated as a fly-back pulse from the de-energization of solenoid winding 186'.

The gate electrodes 442b and 442c of respective SCR's 440b and 440c are connected with sequence logic networks 450 and 452. Network 450 is connected through line 454 to line 434a at the anode side of SCR 440a and, additionally, to line 434b through line 456. Similarly, logic network 452 is coupled with line 434b at the anode side of SCR 440b through line 458 and to lamp circuit line 434c at the anode side of SCR 440c through line 460. Networks 450 and 452 serve to detect the previous firing of a flashlamp, for instance at 430a, and cause the circuit to select a next flashlamp, i.e., 430b, by relaying a firing or gating pulse to the appropriate SCR thereof, i.e., 440b. Additionally, networks 450 and 452 serve to establish a predetermined resistance or impedance intermediate the sequence of lamp circuit lines 434a–434c. Of course, it is understood, that the circuit is capable of accommodating more than three flashlamps through the expedience of adding additional lamp circuit lines and sequence logic networks. Described in detail in U.S. Pat. No. 3,676,045, sequence logic networks 450 and 452 respond to the impedance witnessed at the terminals of a fired flashlamp to select a next succeeding lamp. Generally, a value of impedance meant to represent a fired flashlamp is selected in the design of the circuits, for instance, 75 ohms or greater, may be considered to represent an open circuit. Such an arrangement accommodates for misfirings of lamps or inoperative lamps within an array.

Figure 14:
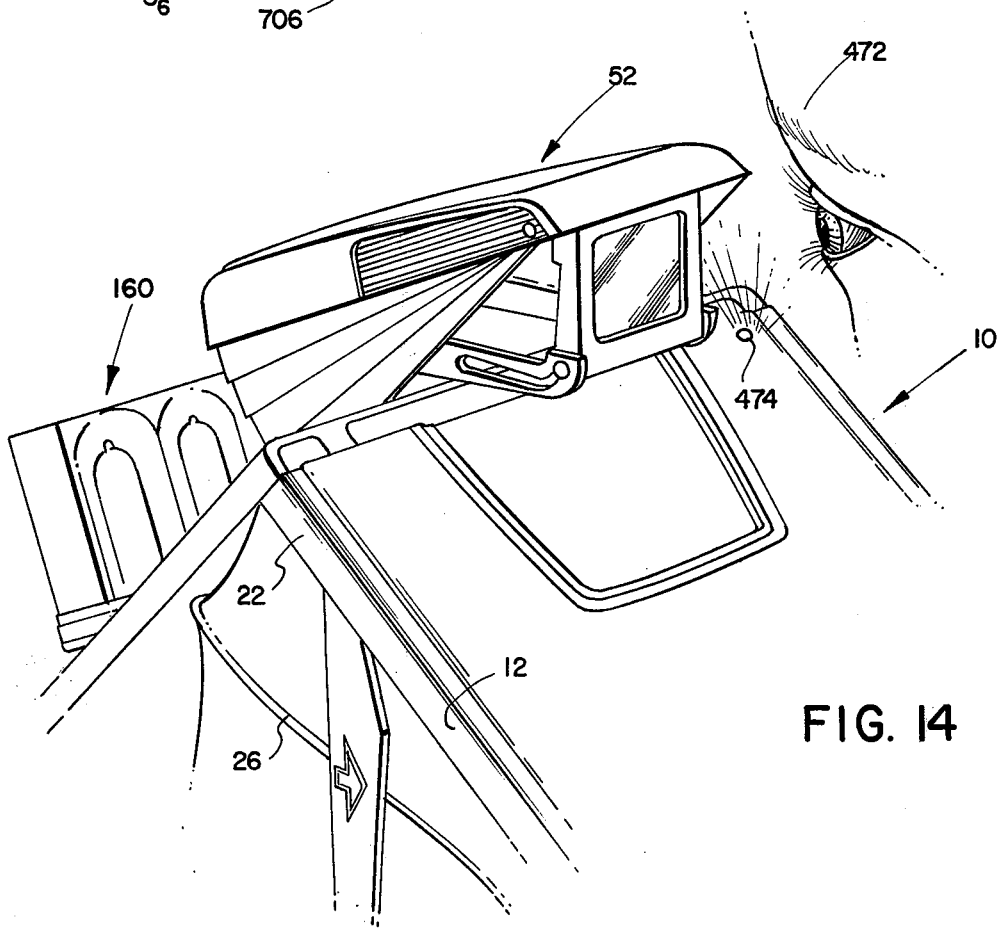
FIG. 14 is a pictorial representation of a portion of the camera of FIG. 1 revealing the viewing system thereof in greater detail.

Returning to FIG. 3, the operation of a principal embodiment of the instant invention is revealed as it relates with the photographic cycle of camera 10. As shown at block 462, with the closure of switch $S_1$ to commerce a photographic cycle, a flashlamp status detection arrangement is activated. This detection arrangement surveys the terminals of the array 160, shown in FIG, 1, to assure that an unexpected flashlamp remains. In the event that no such flashlamp is present in an operational orientation, an inhibit network is activated as represented at block 464. Network 464 alternately may prevent the energization of motor 110 as represented by dashed lead 466 or may react to prevent energization of solenoid 80 as represented by dashed lead 468. Simultaneously, an expended array warning may be energized as to 470 to apprise the operator of the cause of camera 10 not completing a photographic cycle. Note that in the arrangement, the blocking or prevention of the carrying out of a photographic cycle takes place before cycle commitment 344. Recall that this commitment takes place when the circuit is electrically latched and ram 118 has been released. The inhibition of a photographic cycle at the commencement of motor energization as represented by dashed lead 466 provides particular advantage to the utilization of an expended array warning such as a light emitting diode. Looking to FIG. 14, the viewing components of camera 10 are represented in conjunction with an eye station 472 and a signal lamp 474. Note that lamp 474 is very small and located remotely from the entrance optics of viewing station 52. By permitting the energization of solenoid 80 as represented at block 234, the operator at eye station 472 will encounter a pronounced darkness effect due to the closure of blades 60 and 62. Simultaneously, the very small lamp 474 will be illuminated to apprise the operator that flash array 160 is inoperative. Even though lamp 474 is displaced, the blocking of viewing through station 52 makes the illumination from small lamp 474 readily perceptible.

Returning to FIG. 2, a network serving to detect that no valid flashlamp exists in array 160 as it is oriented on camera 10 is represented in block form at 476, while a network serving to inhibit the operation of motor control 290 is represented at block 478. Network 476 is responsive from along line 480 to the closure of switch $S_2$. Additionally, network 476 is connected with flash firing circuit 380 from along leads 482 and 484. These leads are reproduced in primed form in FIG. 8 and are located to respond to the impedance witnessed across both last lamp terminal 432c as well as the accumulated values of resistance represented by the serial intercoupling of sequence logic networks 450 and 452. Power input to network 476 is derived from lines 481, 485 and 487, while connection with ground is provided through line 486. Inasmuch as line 485 is coupled to line 382, which in turn is coupled to power lead 216 through switch $S_4$, a line 488 incorporated a resistor 490 is coupled in shunt across the C-A contacts of switch $S_4$, i.e., between lines 382 and 260. Resistor 490 is selected having a value sufficient to power down flash firing circuit 380, while remaining adequate to permit the logic operation of detect network 476. Inhibit network 478 is coupled to receive the unique signal of network 476 from along line 492, while its connection for disabling the operation of motor control 290 is provided from along line 494. Recall that the output $t_3$ of GATE C at line 284 is "high" at such time as motor control circuit 290 energizes motor 110. Accordingly, network 478 diverts this high signal along line 494 to ground through line 496 to halt a photographic cycle. Network 478 also is coupled through line 498 to line 288 above switch $S_5$. As represented at block 500 in FIG. 3A, this connection is required inasmuch as detecting network 476 would activate network 478 just following the firing of a last flashlamp upon the operative side of an array to prevent the completion of that valid photographic cycle. Inasmuch as switch $S_5$ has unique orientations at the commencement of a photographic cycle and during and following the initiation of optical path conversion, it is utilized to disable inhibit network 478 for this particular situation. Network 478 is energized from auxiliary power line 232.

Figure 9:
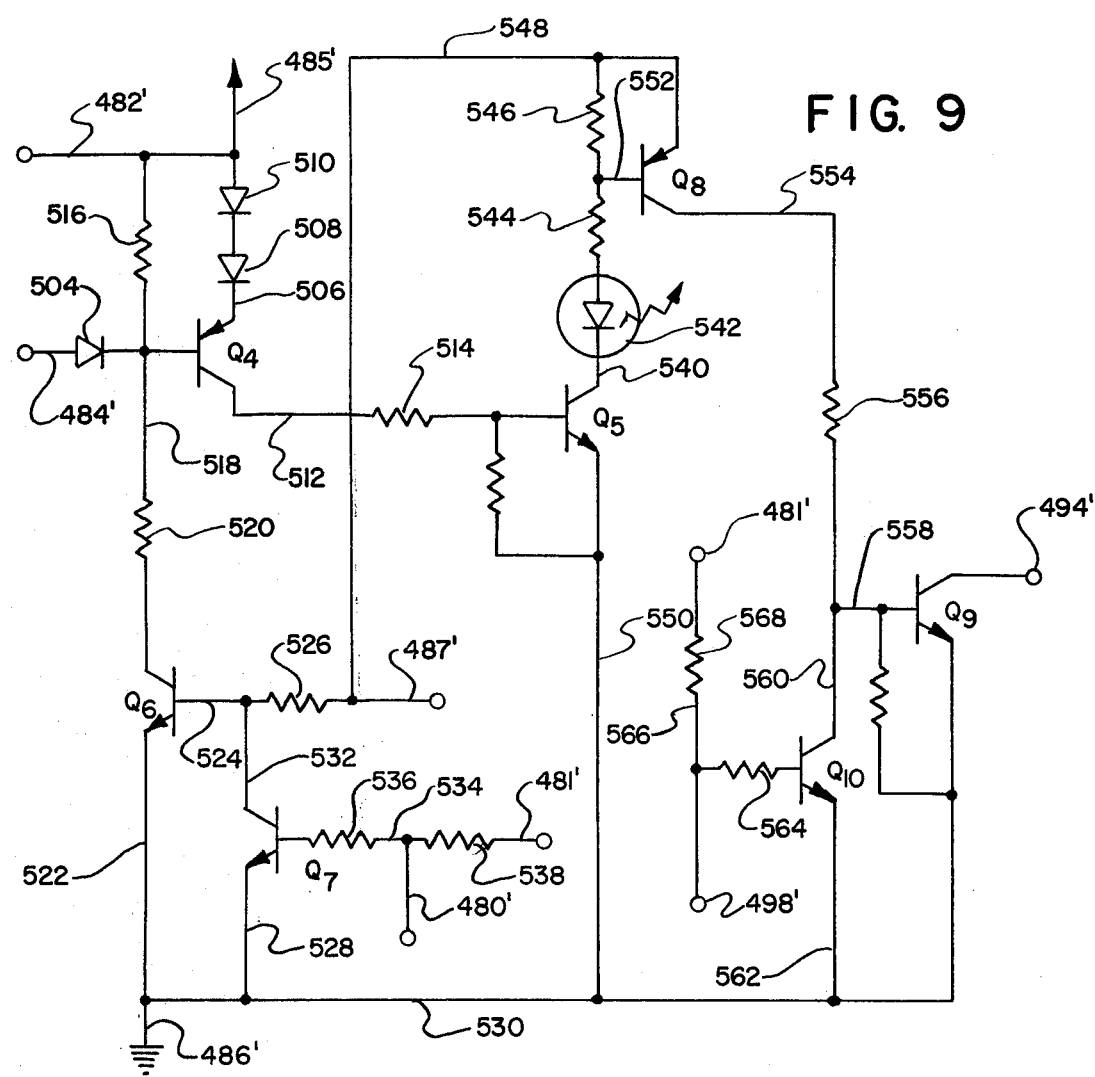
FIG. 9 is a circuit diagram illustrating one embodiment of the detect and inhibit operation of the instant invention.

The detect and inhibit operation as encompassed within the dashed boundary 502 in FIG. 2 is represented in detail in the embodiment of FIG. 9. Looking to the figure, the detecting function of the circuit taps or is coupled across the final flashlamp to be fired within one operational face of an array be previously described leads 482' and 484'. Lead 484' extends through a blocking diode 504 to the base of a PNP detecting transistor $Q_4$. The emitter of transistor $Q_4$ is coupled through line 506 to diodes 508 and 510 to lead 482' and power input lead 485', while its collector is coupled through line 512 and resistor 514 to the base of an NPN transistor $Q_5$. A hold-off resistor 516 is connected between leads 482' and 484'. The base of transistor $Q_4$ also is coupled through line 518 and a resistor 520 to the collector of NPN transistor $Q_6$. The emitter of transistor $Q_6$ is connected to ground through line 522, while the base thereof is coupled through line 524 and resistor 526 to connection with lead 487'. With the latter arrangement, the base-emitter junction of transistor $Q_6$ may be found biased into conduction with the depression of switch $S_1$. Under such conditions wherein transistor $Q_6$ is on, transistor $Q_4$ may sample the impedance and consequent voltage drop between leads 482' and 484'. Under conditions wherein a valid flashlamp is present within array 160, transistor $Q_4$ remains off. However, with the expenditure of all lamps within the array, resistance across leads 482' and 484' approaches infinity and equals or exceeds the voltage drop represented by diodes 508, 510 and the baseemitter junction of transistor $Q_4$. In consequence, transistor $Q_4$ conducts. The sensitivity of this forward biasing of transistor $Q_4$ also is controllable by selecting the value of resistance at resistor 520.

To provide for sampling operation of the circuit only during such time as a flash array is inserted in camera 10 and the camera is operating in a flash mode, a transistor $Q_7$ is provided to selectively shunt the forward bias asserted at transistor $Q_6$. The emitter of transistor $Q_7$ is coupled to ground through lines 528 and 530, while its collector is coupled through line 532 to line 524 at the base of transistor $Q_6$. The base of transistor $Q_7$ is connected through line 534 and resistors 536 and 538 to voltage supply lead 481'. Accordingly, transistor $Q_7$ is normally biased into conduction to, in turn, divert the forward biasing current from the base of transistor $Q_6$. The forward bias asserted at transistor $Q_7$ is removed, however, by virtue of the connection of line 480' with line 534. Line 480' connects line 534 with ground when switch $S_2$ is closed.

The collector of transistor $Q_5$ is coupled with line 540 which, in turn, serially connects a light emitting diode (LED) 542, along with resistors 544 and 548. The emitter of transistor $Q_5$ is connected through line 550 to line 530. Accordingly, when transistor $Q_4$ conducts, transistor $Q_5$ is turned on to permit current passage from line 548 to illuminate diode 542. Diode 542 corresponds with the illuminating device 474 described in connection with FIG. 14.

The base of PNP transistor $Q_8$ is coupled by line 552 to line 540 at a point intermediate resistors 545 and 546. The emitter of transistor $Q_8$ is coupled with line 548, while its collector is connected through line 554, resistor 556 and line 558 to the base of an NPN transistor $Q_9$. The emitter of transistor $Q_9$ is coupled to line 530, while its collector is coupled to line 494'. Line 494' connects with the output line 284 of GATE C. When transistor $Q_5$ is on in consequence of transistor $Q_4$ detecting an expended array, transistor $Q_8$ is drawn into conduction to, in turn, drive transistor $Q_9$ to a forward biased state. As a result, conduction is permitted from line 494' to divert the high signal at line 284 and prevent motor energization. As is apparent, when an expended array is inserted in camera 10, LED 542 is energized to provide a perceptible warning and camera 10 is permitted to cycle only to the extent that blades 60 and 62 are driven to a closed position.

As described in connection with function block 500 of FIG. 3A, it is necessary that transistor $Q_9$ not be forward biased in response to the ignition of a last flashlamp within an array. To prevent such occurrence, an NPN transistor $Q_{10}$ is positioned to selectively divert forward biasing current from line 558. In this regard, the collector of transistor $Q_{10}$ is coupled through line 560 to line 558, while its emitter is coupled through line 562 to line 530. The base of transistor $Q_{10}$ is coupled through resistor 564, line 566 and resistor 568 to lead 481'. Lead 481' in turn is coupled with voltage supply line 232'. The opposite side of line 566 is connected with lead 498', which in turn is coupled with switch $S_5$. Accordingly, at the commencement of a photographic cycle wherein one last flashlamp is available within array 160, transistor $Q_4$ will be off to permit the control system of camera 10 to cycle to the extent that the last flashlamp is ignited. At this point within a photographic cycle, switch $S_5$ is open and transistor $Q_{10}$ is forward biased to remove drive current from line 558 and prevent the forward biasing of transistor $Q_9$. As a consequence, the camera is permitted to carry out the post-exposure portion of a photographic cycle.

Under conditions in which all flashlamps within an array are expended, transistor $Q_9$ will be forward biased inasmuch as switch $S_5$ is closed during the intial portions of a photographic cycle. When so closed, forward biasing current from line 566 is diverted from transistor $Q_{10}$.

Another embodiment for the detect and inhibit feature of the invention is presented in FIG. 10. In this arrangement, resistor 490 extending between lines 260 and 382 is not required inasmuch as the embodiment utilizes the latching characteristic of a silicon control rectifier (SCR) to maintain power levels for logic performance. The remaining structure of the embodiment is substantially the same as the embodiment of FIG. 9.

Looking to the FIG. 10, a detecting PNP transistor $Q_{11}$ is coupled such that its base at line 570 is connected with lead 484' through a blocking diode 572. The emitter of transistor $Q_{11}$ is coupled through line 574, diodes 576 and 578 to lead 482'. It will be recalled that leads 482' and 484' couple across the terminals leading to the final flashlamp of the flash firing circuit 380. Lead 482' is powered through resistor 580 and lead 382' from the C-A terminal connection of switch $S_4$. The emitter of transistor $Q_{11}$ is coupled through line 582 and resistor 584 to the gate electrode of an SCR 586. The base connecting lead 570 of transistor $Q_{11}$ additionally is coupled through line 588 and resistor 590 to the collector of an NPN transistor $Q_{12}$. The emitter of transistor $Q_{12}$ is coupled through line 592 to ground, while its base is coupled through line 594 and resistor 596 to lead 487'. It will be recalled that lead 487' is activated upon the closure of start switch $S_1$. Base connecting line 594 of transistor $Q_{12}$ also is coupled through line 598 to the collector of an NPN transistor $Q_{13}$. The emitter of transistor $Q_{13}$ is coupled to ground, while its base is coupled through line 600, resistors 602 and 604 to lead 481'. Lead 481', in turn, couples with a branch power line of the circuit of FIG. 2. Base connecting line 600 also is coupled through line 606 to lead 480' which, in turn, is connected to the upper side of switch $S_2$.

With the above-described arrangement of transistors $Q_{12}$ and $Q_{13}$, an anding logic combining switches $S_1$ and $S_2$ is provided such that with the depression of switch $S_1$, transistor $Q_{12}$ is forward biased to permit the selective forward biasing of transistor $Q_{11}$ in the event of a defective last flashlamp. Should the contacts of switch $S_2$ not be made, however, transistor $Q_{13}$ is forward biased to, in turn, remove the forward bias at transistor $Q_{12}$.

Assuming an inserted flash array to be expended to cause the consequent forward biasing of transistor $Q_{11}$, current flow is present at line 582 to gate SCR 586 into conduction. The anode side of SCR 586 is coupled through line 610, light emitting diode 612, resistors 614 and 616 to lead 487'. Lead 487' is coupled for energization in conjunction with the depression of switch $S_1$. The cathode side of SCR 586 is connected through line 618 to ground. With this arrangement, with the forward biasing of transistor $Q_{11}$, SCR 586 serves to energize LED 612 to apprise the operator of an expended flashlamp. Because of its latching characteristic, SCR 586 maintains this conduction even though switch $S_4$ transfers to a contact orientation C-B. However, when the latter orientation is realized, an NPN transistor $Q_{14}$ is forward biased by virtue of the activation of line 620 from lead 258'. Line 620 is coupled through resistor 622 to the base of transistor $Q_{14}$, the collector thereof is coupled through line 622 to gate line 582 and the emitter thereof is coupled to ground through line 624. With this arrangement, the gating signal present at line 582 is coupled to ground to divert any noise transients generated from operation of motor 110 when switch $S_4$ is in the noted orientation.

As in the embodiment of FIG. 9, the inhibit function of the instant embodiment includes a PNP transistor $Q_{15}$, the base of which is coupled through line 626 to line 610 at a point intermediate resistors 614 and 616, while its emitter is coupled through line 628 to lead 487' for energization in conjunction with the depression of switch $S_1$. The collector of transistor $Q_{15}$ is coupled through line 630, resistors 632 and 634 to the base of NPN transistor $Q_{16}$. The collector of transistor $Q_{16}$ is coupled through line 494' to the output $t_3$ of motor drive GATE C, while its emitter is connected to ground through line 636. As before, with the forward biasing of transistor $Q_{15}$, transistor $Q_{16}$ is driven into conduction to disable motor control function 290.

Similar to the embodiment of FIG. 9, the present circuit also includes an NPN transistor $Q_{17}$, the collector of which is coupled through line 638 to line 630 and the emitter of which is coupled through line 640 to ground. Transistor $Q_{17}$ is normally into conduction by virtue of the connection of line 642 from its base through resistor 644 and line 481' to auxiliary power lead 232. Line 642 also is coupled to line 498', in turn, is connected through switch $S_5$ to ground. Accordingly, transistor $Q_{16}$ is held off when switch $S_5$ is open. As before, this arrangement permits the completion of a photographic cycle utilizing the last valid flashlamp within an array.

FIG. 11 presents another embodiment for the detector arrangement of the invention. In this arrangement, the impedance exhibited by the flashlamp array again is present between terminal leads 482' and 484'. Lead 482' is coupled through line 650 to line 652 at a point intermediate resistors 654 and 656. The upward side of line 652 is coupled to a voltage supply through resistor 654, for instance as may be derived from lead 481. The opposite side of line 652 extends through resistor 658, line 660 and into the switches $S_1$, $S_2$ AND LOGIC feature described in FIGS. 9 and 10, respectively, in connection with transistors $Q_6$, $Q_7$ and $Q_{12}$ and $Q_{13}$. Function 662 is shown coupled to ground through line 664.

The opposite lead 484' from the flash array is connected to line 666, in turn leading through resistor 668 and line 660 to AND LOGIC block 662. Line 666 also is coupled through line 670 to one input of a differential type operational amplifier 672. The opposite input to amplifier 672 is present at line 674 which is coupled to line 652 at a point intermediate resistors 656 and 658. The resistance value of resistor 656 is selected to correspond with the predetermined impedance evidenced by a fully expended flash array, for instance, 75 ohms. Resistor 668 and 658 are configured having the same resistance values so as to evolve a voltage dividing comparison network, the output of which at lines 670 and 674 is amplified at amplifier 672. Note that amplifier 672 is coupled to a +V supply through line 676 and to a lead of opposite polarity at line 678. The output of amplifier 672 is coupled through line 680 to an inhibit and warn network 682. Such a network has been described in FIGS. 9 and 10, respectively, in connection with transistors $Q_5$, $Q_8$ – $Q_{10}$ and SCR 586, in conjunction with transistors $Q_{15}$ – $Q_{17}$. When an operative flash array is present within the system, the output of amplifier 672 may be considered low and when the resistance across lines 650 and 670 high, the output of amplifier 672 reverts to an opposite level, for instance high. Such a high value would serve to forward bias transistor $Q_5$ as represented in FIG. 9 or to gate SCR 586 as shown in FIG. 10.

Returning to FIG. 3, another embodiment for the expended array warning feature of the invention is revealed. As shown at block 690, a lamp status detection network may be incorporated within the exposure control of camera 10 which is activated upon the erecting of the camera into its operative orientation shown in FIG. 1. Upon effecting such erection and the inserted of a flash array as shown at block 222, lamp status detect function 690 will provide an expended array warning as shown at block 692 contemporaneously with viewing and focusing procedures. This warning would be provided as described at lamp 474 in FIG. 14. Such a warning is available inasmuch as switch $S_4$ maintains a C-A configuration during periods of nonuse and during focusing and viewing procedures. In consequence, energy is available to flash firing circuit 380 when interlock switch $S_6$ in line 212 is closed.

Figure 13:
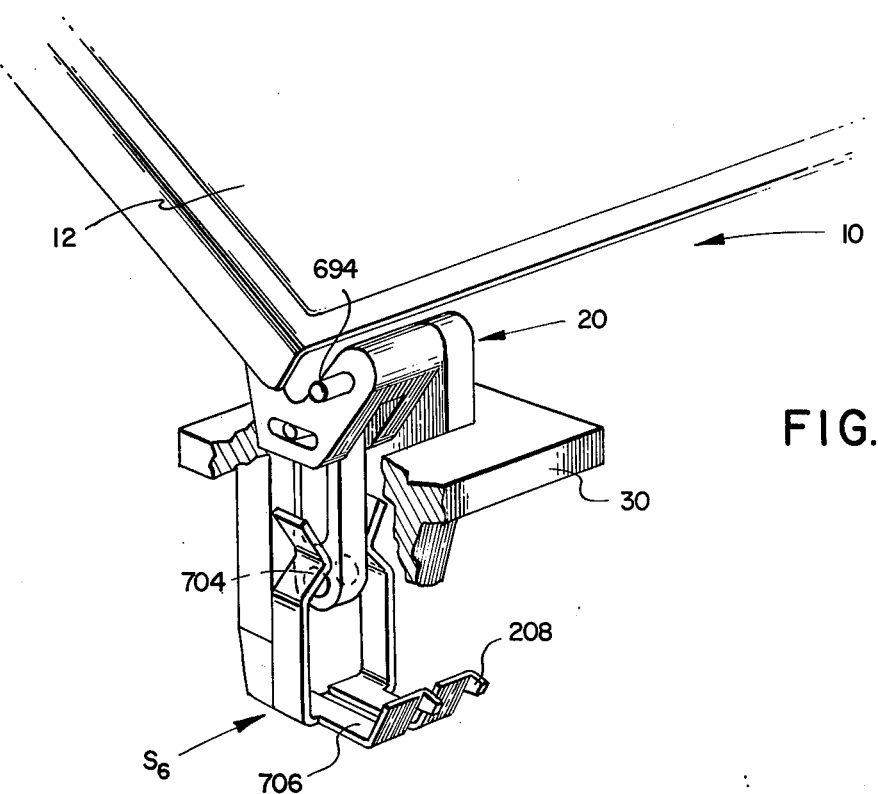
FIG. 13 is a schematic representation of an interlock switch within the camera of FIG. 1.

Looking to FIG. 13, the structure of this interlock switch $S_6$ is revealed in detail as it is positioned at a rear corner of camera 10. The figure reveals in detail that back cover 12 is connected to inner frame 30 at an offset hinge connection depicted generally at 20. Hinge 20 includes a pinned connection 694 coupling back wall 12 to inner frame 30 and a bifurcate eccentric extension 696 which is slotted at 698. Note that the bifurcate structure 696 defines an internal slot or keyway 700 within slot 698 and pinned for movement within slot 698 is a switch actuator 702. Actuator 702 is constrained for vertical movement in conjunction with the pivotal movement of back wall 12. Actuator 702 is formed of plastic insulative material except for its lower portion which is configured to retain a conductive pin, the conducting surfaces of which are shown at 704. Biased against opposite sides of actuator 702 are resilient switch leaves 706 and 708. With the arrangement shown, when back cover 12 is maneuvered upwardly from the partially erected orientation shown, conducting surfaces 704 will move into contact simultaneously with resilient leaves 706 and 708 to close switch $S_6$ when camera 10 is fully erected. As shown in FIG. 2, the closure of switch $S_6$ provides for the assertion of power through lines 216, 260, switch $S_4$ and line 382 to flash firing circuit 380.

Figure 12:
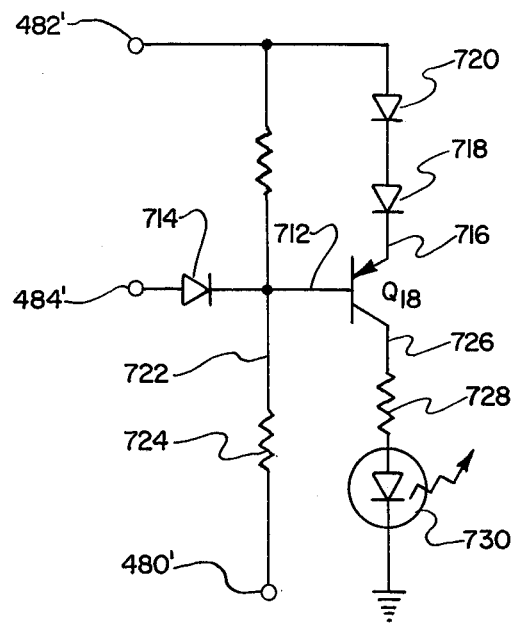
FIG. 12 shows a circuit diagram for a warning arrangement of the invention.

Returning to FIG. 12, when a flash array is inserted in camera 10, the base of PNP transistor $Q_{18}$ will be coupled through line 712 and blocking diode 714 to lead 484', while its emitter will be connected through line 716, diodes 718 and 720, to opposite flash firing circuit lead 482'. Line 712 further is coupled through line 722 and resistor 724 to switch $S_2$ lead 480'. The collector of transistor $Q_{18}$ is coupled through line 726, resistor 728 and light emitting diode (LED) 730 to ground. With the arrangement shown, in the presence of an expended flash array, transistor $Q_{18}$ will be forward biased to permit current conduction through line 726 to energize LED 730. As in the embodiments of FIGS. 9 and 10, the resistance value a resistor 724 as well as the selection of voltage drop evidenced at diodes 718, 720 and the base emitter junction of the transistor $Q_{18}$ establishes the impedance sensitivity of the detector circuit.

Since certain changes may be made in the abovedescribed system and apparatus without departing from the scope of the invention herein involved, it is intended that all matter contained in the description thereof as shown in the accompanying drawings shall be interpreted as illustrative and not in a limiting sense.

I claim:

1. A flash exposure system for use with photographic apparatus of a variety actuable to automatically carry out a sequence of operational events from first to last defining a photographic cycle, comprising:
    means for mounting an array of flashlamps in an orientation for ignition to illuminate a scene and including terminals means for providing electrical connection with each said flashlamp and for exhibiting a predetermined electrical state in the presence of a condition representing an ignition of all said flashlamps within said array;
    firing circuit means connected with said terminal means for selecting one of said flashlamps in predetermined order from first to last and igniting said selected flashlamp in synchronism with a predetermined one of said operational events;
    electrical detector means responsive to said terminal means electrical state for deriving a unique electrical signal condition representative thereof, said detector means including:
        a comparison network coupled with said terminal means, said comparison network incorporating said predetermined electrical state as a compared component thereof and providing a predetermined output condition in the presence of said terminal means electrical state, and
        a differential amplifier means responsive to said predetermined output condition for deriving said unique electrical signal condition; and
    inhibit means responsive to said unique electrical signal condition for preventing the carrying out of select said operational events following the completion of a number of photographic cycles expending all said arrayed flashlamps in said orientation to illuminate a scene.

2. The flash exposure system of claim 1 in which said inhibit means further comprises indicator means energizable in response to said unique electrical signal condition for providing a perceptible warning signal.

3. The flash exposure system of claim 1 in which said inhibit means includes means sensing the status of an exposure producing operational event of a said photographic cycle for overriding said inhibit means cycle prevention function during a said cycle wherein a said last flashlamp is ignited.

4. In reflex photographic apparatus of a variety including drive means actuable for converting an optical path between viewing and exposure orientations, reflex viewing means for operator viewing and framing of a scene to be photographed, shutter means selectively actuable to block and unblock said optical path, control means responsive to start actuation for actuating said shutter means and said drive means in a manner providing a predetermined series of operational events defining a photographic cycle, said control means being operative to actuate said shutter means to block said optical path prior to said drive means actuation and including transducer means having a first condition at the commencement of a said photographic cycle and a second condition commencing when said optical path converts to said exposure orientation, said apparatus further including means for mounting an array of flashlamps in an orientation for ignition to illuminate a scene, said mounting means including terminal means for providing electrical connection with each said flashlamp and for exhibiting a predetermined electrical state in the presence of a condition representing an ignition of all said flashlamps within said array, firing circuit means connected with said terminal means for selecting one said flashlamps in predetermined order from first to last and igniting said selected flashlamp in synchronism with a predetermined one of said operational events, electrical detector means responsive to said terminal means electrical state for deriving a unique electrical signal condition represenative thereof, inhibit means responsive to said unique electrical signal condition for preventing the carrying out of select said operational events following the expanding of all said flashlamps arrayed in said orientation to illuminate a scene, the improvement comprising sensing means responsive to said transducer means second condition for overriding said inhibit means cycle prevention performance, whereby a said photographic cycle may be completed upon the ignition of a last said flashlamp operably positioned within said array.

5. The improved apparatus of claim 4 in which said detector means includes enabling means responsive when said apparatus is operated to ignite a said flashlamp for enabling said detector means to derive said unique signal condition, and said detector means is so operative in response to said start actuation.

6. The improved apparatus of claim 5 in which said inhibit means is operative in response to said unique signal condition to inhibit said drive means actuation following said start actuation of said shutter means.

7. The improved apparatus of claim 6 in which said inhibit means further comprises indicator means energizable in response to said unique signal condition for providing a perceptible warning signal.

8. The improved apparatus of claim 4 in which said inhibit means further comprises indicator means energizable in response to said unique electrical signal condition for providing a perceptible warning signal, said indicator means being mounted upon said apparatus in a position spaced from said reflex viewing means but perceptible by said operator when so energized.

9. The improved apparatus of claim 8 in which said inhibit means is operative in response to said unique electrical signal condition to prevent the carrying out of all operational events following a said actuation of said shutter means to block said optical path in response to said start actuation of said shutter means.

10. A photographic camera comprising:
means actuatable for automatically performing a sequence of operational events from first to last defining an operational cycle of said camera;
selectively operative means for actuating said performing means;
means actuatable responsive to operation of said performing means for continuously monitoring the operational condition of said camera and for inhibiting the performance of at least a select one of said events to interrupt said sequence when said camera condition is unsuitable for performance of said camera cycle; and
means responsive to the progression of said performing means through a portion of said cycle and at least through said select event for disabling said monitoring and inhibiting means to at least override the inhibiting function thereof during at least a subsequent portion of the remainder of said cycle.

11. The system of claim 10 wherein said monitoring and inhibiting means includes a detector circuit providing a given output signal when said camera condition is unsuitable for performance of said camera cycle and an inhibit circuit responsive to said given detector output signal for inhibiting the performance of said select one event, and said disabling means includes an override circuit responsive to performance of said select event for precluding operation of said inhibit circuit during said portion of the remainder of said cycle.

12. The system of claim 10 wherein said performing means includes a selectively operative illumination producing device having a first state wherein said device is actuatable to produce a flash of illumination of a magnitude suitable for film exposure and a second state wherein said device is incapable of producing said magnitude of illumination, and said monitoring and inhibiting means includes means for sensing said states of said device and for permitting the performance of said sequence when said device is in its said first state and prohibiting the performance of said one event and said sequence when said device is in said second state.

13. The system of claim 12 wherein said camera includes means for mounting photographic film material at a given exposure position, means for defining an optical path between a photographic scene and said film material, said performing means includes a shutter mechanism operable to unblock and block said optical path to produce an exposure of said film material, means for actuating said illumination producing device during said exposure, and a drive mechanism operable in said sequence both before and after said exposure, said monitoring and inhibiting means prohibiting the operation of said drive mechanism when said illumination producing device is in said second state, and said disabling means is responsive to operation of said drive means before said exposure operation to override said inhibit function and thereby permit operation of said drive mechanism after said exposure operation even when said illumination producing device is in its said second state as a result of its actuation during said exposure operation.

14. The camera of claim 10 wherein said performing means comprising a control circuit electrically energizable from a power source to perform said sequence of events, said selectively operative means includes a manually operative switch at least initially coupling said control circuit to said power source, and said disabling means includes latch means responsive to performance of said select event for continuing the energization of said control circuit to commit said control circuit to effect complete performance of said camera cycle.

15. In a photographic camera of a through the lens viewing type actuatable to automatically rapidly carry out a sequence of operational events defining a camera cycle including film exposure, said events including in sequence converting the camera from a through the lens viewing mode to an exposure mode, exposing film material located in an exposure position, and then converting the camera back to the viewing mode with the sequence progressing with sufficient rapidity that the operator's view through the lens is only momentarily interrupted, said camera including a normally open shutter actuatable, during camera conversion to the exposure mode, from an initial open position unblocking the optical path of the camera lens to a fully closed position blocking said optical path, the improvement comprising means operative when conditions are unsuitable for satisfactory operation of said camera for automatically interrupting said cycle following actuation of said shutter from its said initial to its said closed position so that, when said conditions are unsuitable, said camera cycle is inhibited with said shutter at least temporarily disposed in its said closed position thereby providing the operator with a visual indication that said conditions are unsuitable for camera operation.

16. The improvement of claim 15 wherein said shutter includes a blade mechanism mounted for displacement between a first arrangement wherein said blade mechanism is in unblocking relation to the optical path and a second arrangement in blocking relation thereto, means for continuously biasing said blade mechanism toward its said first arrangement, and drive means actuatable for displacing said blade mechanism to its said second arrangement such that upon deactuation of said camera following inhibiting of said camera cycle said blade mechanism is automatically returned under the influence of said biasing means to said first arrangement.

17. A photographic camera comprising means when energized by a source of power for automatically performing a sequence of events defining an operational cycle of said camera, means energizeable for sensing the operational condition of said camera and for inhibiting the performance of at least one select event to interrupt said camera cycle when said operational condition is unsuitable for performance of said camera cycle, and manually operative means for coupling and performing means to said source of power, said performing means including a plurality of selectively operative elements and a control circuit energizeable for automatically operating said elements to perform said sequence, said control circuit including means for actuating said sensing and inhibiting circuit prior to performance of said select event and latching means, responsive to operation of said select event, for disabling said sensing and inhibiting means and for continuing the energization of said control circuit until the completion of that camera cycle.

18. The camera of claim 17 wherein said latching means includes a switch circuit actuatable responsive to performance of said select event from a first state wherein said control circuit is energized only through said manually operative means and said sensing and inhibiting circuit is not disabled and a second state wherein said control circuit is energized through said switch circuit and said sensing and inhibiting means is disabled.

* * * * *